US010645159B1

(12) United States Patent
Chen et al.

(10) Patent No.: US 10,645,159 B1
(45) Date of Patent: May 5, 2020

(54) APPLICATION PROGRAMMING INTERFACE FOR PROCESSING DUPLICATION REQUESTS AND DUPLICATING DIGITAL OBJECTS FROM MULTIPLE DIGITAL-OBJECT LEVELS

(71) Applicant: Facebook, Inc., Menlo Park, CA (US)

(72) Inventors: Tierui Chen, Medina, WA (US); Xia Lin, Kirkland, WA (US)

(73) Assignee: FACEBOOK, INC., Menlo Park, CA (US)

( * ) Notice: Subject to any disclaimer, the term of this patent is extended or adjusted under 35 U.S.C. 154(b) by 155 days.

(21) Appl. No.: 15/925,691

(22) Filed: Mar. 19, 2018

(51) Int. Cl.
*H04L 29/08* (2006.01)
*G06F 9/54* (2006.01)
*G06F 16/40* (2019.01)

(52) U.S. Cl.
CPC ............ *H04L 67/1095* (2013.01); *G06F 9/54* (2013.01); *G06F 16/40* (2019.01)

(58) Field of Classification Search
CPC ............... G06F 2212/154; G06F 3/067; H04L 67/1097; H04L 67/42
See application file for complete search history.

(56) References Cited

U.S. PATENT DOCUMENTS

| | | | | |
|---|---|---|---|---|
| 9,569,502 B1* | 2/2017 | Strobl | ...................... | H04L 67/32 |
| 9,894,423 B1* | 2/2018 | Spencer | ............... | H04N 21/812 |
| 10,282,757 B1* | 5/2019 | Bitoun | ............... | G06Q 30/0251 |
| 2008/0040216 A1* | 2/2008 | Dellovo | ............ | G06Q 10/0637 |
| | | | | 705/14.44 |
| 2014/0278976 A1* | 9/2014 | Braytenbaum | .... | G06Q 30/0255 |
| | | | | 705/14.53 |
| 2015/0032541 A1* | 1/2015 | Haddad | ............... | G06Q 30/0259 |
| | | | | 705/14.57 |
| 2015/0088635 A1* | 3/2015 | Maycotte | ........... | G06Q 30/0244 |
| | | | | 705/14.43 |
| 2016/0371735 A1* | 12/2016 | Walden | ............... | G06Q 30/0261 |
| 2019/0188285 A1* | 6/2019 | Scheau | ............... | G06F 16/9535 |

* cited by examiner

*Primary Examiner* — Joe Chacko
(74) *Attorney, Agent, or Firm* — Keller Jolley Preece

(57) ABSTRACT

This disclosure covers methods, non-transitory computer readable media, and systems that provide an application programming interface ("API") for facilitating requests and duplication of multiple associated digital objects maintained within multiple levels of a digital content account. In some implementations, the API facilitates duplication of multiple digital objects based on a single API request that identifies (or includes duplication parameters for) associated digital objects from different levels within a digital content account.

20 Claims, 10 Drawing Sheets

402

```
$params = array(
    AdsAPIAdCopyFields::AD_OBJECT_IDS =>[$290190], }408
    AdsAPIAdCopyFields::ADDRAFT_ID => $64321,   }410
    AdsAPIAdCopyFields::REPARENTING_ID => $724381, }412
    AdsAPIAdCopyFields::DEEP_COPY => true, }414
);
                                        418
$result = await api('act_' . 296312 . '/asyncadcopies') }420
->callType(GraphAPICallTypes::POST)    }422
->params(FBGraphCodemodUtils::toStringMap($params)) }424
->userToken()
->app($vc->getAppID())
->user($vc->getAccountID())            }425
->gen();
```

406 brackets lines 408–414
416 brackets lines 418–gen()

404

```
{
                          426
   'addraft_id' => 64321,
   'addraft_fragments' => [
      {
        'ad_object_type' => AdObjectLevels::CAMPAIGN,
        'id' => 724381,
      },
                428a
      {
        'ad_object_type' => AdObjectLevels::AD_SET,
        'id' => 2901901.1
      },
                428b
      {
        'ad_object_type' => AdObjectLevels::AD
        'id' => 9138641.1,
      },
                428c
   ],
}
```

*Fig. 4*

APPLICATION PROGRAMMING INTERFACE FOR PROCESSING DUPLICATION REQUESTS AND DUPLICATING DIGITAL OBJECTS FROM MULTIPLE DIGITAL-OBJECT LEVELS

BACKGROUND

Digital content providers increasingly place digital content on the Internet and in other digital forums. For example, some search engines strategically place images or videos (and corresponding text) within or by search results. In another context, some social networking systems place images or videos (and corresponding text) in newsfeeds or on user's profile pages. In both search results and newsfeeds—as well as in many other digital forums—a digital content provider may repeatedly place the same or related digital content items before different users as part of a campaign to deliver digital content items to a target audience.

Such digital content items elicit varying reactions from network users depending on the digital content items' various specifications. While one digital content item's content may prompt thousands or millions of users to download an application, another digital content item's content may have little impact on users' download of an application. In addition to creative content, each digital content item may include a range of different specifications—from schedules for delivery to demographic targeting—that may produce varying amounts of website traffic, conversions, or some other measure of the digital content item's effectiveness.

Some firms and organizations create tens, hundreds, or thousands of digital content items with varying specifications in search of a combination that increases a digital content item or campaign's effectiveness. In some cases, a digital content provider (or its client firm or organization) may attempt to recapture the effectiveness (or change a digital content item's impact) by duplicating one or more digital content items. By contrast, in other cases, a digital content provider, firm, or organization may duplicate and modify one or more digital content items to hopefully improve their effectiveness.

To facilitate duplicating such digital content items, digital content providers often provide an interface that captures or facilitates duplication requests. Some conventional interfaces, however, limit a client to duplication requests for only one or a few digital content items at a time. Relatedly, some conventional interfaces include various menus, tools, and other options that a user must navigate through to select and identify different digital content items and corresponding specifications for duplication. Such conventional interfaces are tedious for clients to use. Additionally, some such conventional interfaces require client devices and digital content providers' servers to exchange numerous requests and responses to duplicate multiple digital content items. These numerous requests and responses increase both the load and timing that a digital content provider's servers must bear or consume to duplicate multiple digital content items.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed systems provide an application programming interface ("API") that facilitates requests and duplication of multiple associated digital objects maintained within multiple levels of a digital content account. In some implementations, the API facilitates duplication of multiple digital objects based on a single API request that identifies (or includes duplication parameters for) associated digital objects from different levels within a digital content account.

In some embodiments, for instance, the systems maintain a digital content account that includes digital-object levels. The digital-object levels may include different types of digital objects. For example, in some embodiments, a third level includes one or more digital content campaigns and a campaign objective for each digital content campaign; a second level includes one or more digital content sets and budgetary parameters, scheduling parameters, and audience parameters for each digital content set; and a first level includes one or more digital content items and creative content for each digital content item. The systems receive an API request identifying digital objects from the digital-object levels for duplication. Based on the API request, the systems duplicate the digital objects from the digital-object levels within the digital content account.

The disclosed systems overcome the limits of conventional interfaces described above. By processing an API request to duplicate multiple digital objects from different levels of a digital content account, the disclosed systems provide an API that avoids the request-by-request duplication of digital content items that hinder existing interfaces and slow the processing of duplication requests. By using an API request to duplicate multiple digital objects from multiple levels, the disclosed systems also avoid the numerous menus, tools, and options that conventional interfaces force users to navigate to select and identify different digital content items. In sum, the disclosed systems provide a unique API with protocols that simplify and reduce the computer processing to duplicate digital objects from multiple levels of a digital content account.

BRIEF DESCRIPTION OF THE DRAWINGS

The detailed description refers to the drawings briefly described below.

FIG. 4 illustrates an API duplication request and an API response in accordance with one or more embodiments.

DETAILED DESCRIPTION

Figure 1:
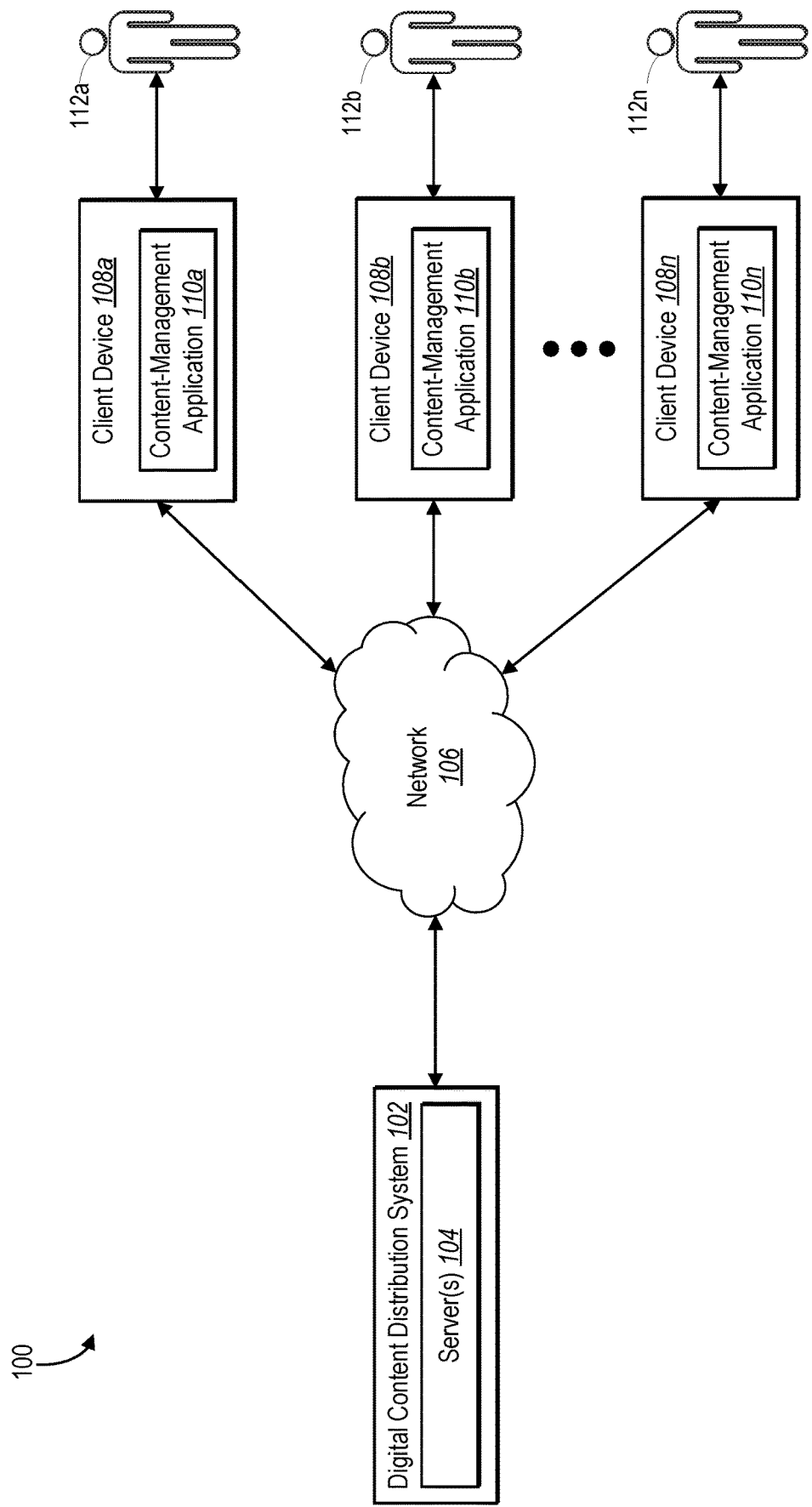
FIG. 1 illustrates a block diagram of an environment for implementing a digital content distribution system in accordance with one or more embodiments.

This disclosure describes a digital content distribution system that provides an application programming interface ("API") to facilitate requests and duplication of multiple associated digital objects maintained within multiple levels of a digital content account. In some implementations, the API facilitates duplication of multiple digital objects based on a single API request that identifies (or includes duplication parameters for) associated digital objects from different levels within a digital content account.

In some embodiments, for instance, the digital content distribution system maintains a digital content account that includes digital-object levels. The digital-object levels may include different types of digital objects. For example, in some embodiments, a third level includes one or more digital content campaigns and a campaign objective for each digital content campaign; a second level includes one or more digital content sets and budgetary parameters, scheduling parameters, and audience parameters for each digital content set; and a first level includes one or more digital content items and creative content for each digital content item. The digital content distribution system receives an API request identifying digital objects from the digital-object levels for duplication. Based on the API request, the digital content distribution system duplicates the digital objects from the digital-object levels within the digital content account.

To facilitate duplicating multiple digital objects, the API may recognize different types of API requests. For example, in some embodiments, the API request includes a digital-object identifier for a digital object, such as a campaign identifier for a digital content campaign or a set identifier for a digital content set. The API request may further include a duplication parameter indicating a request to duplicate additional digital objects associated with the digital object identified in the request, such as a duplication parameter prompting the digital content distribution system to duplicate digital objects associated with the digital object identified in the request from various digital-object levels.

The API request triggers the digital content distribution system to duplicate multiple digital objects from multiple digital-object levels associated with an identified digital object. For example, in some embodiments, the API request identifies a digital content set for duplication. Upon receiving the API request, the digital content distribution system creates copies of the digital content set and other digital objects associated with the digital content set. The other associated digital objects may include, for instance, associated budgetary parameters, associated scheduling parameters, and associated audience parameters; a digital content item associated with the digital content set and the digital content item's creative content; and, similarly, an additional digital content item associated with the digital content set and the additional digital content item's additional associated creative content.

When duplicating digital objects from multiple digital-object levels, the digital content distribution system optionally uses a synchronous-duplication process or an asynchronous-duplication process. For example, in some embodiments, the digital content distribution system duplicates digital objects using servers that implement a synchronous-duplication process with memory restrictions and time restrictions for duplication. By contrast, in some embodiments, the digital content distribution system duplicates digital objects using servers that implement an asynchronous-duplication process with duplication sessions. In certain implementations, the asynchronous-duplication process provides larger memory and time parameters than the synchronous-duplication process.

After duplicating digital objects from multiple digital-object levels, the digital content distribution system optionally provides a response to the requesting client device. In some cases, the response indicates identifiers for duplicated digital objects, such as an identifier for a duplicated digital content campaign or an identifier for a duplicated digital content set. By contrast, in some cases, the response includes a session identifier for a duplication session of the digital content distribution system duplicating the digital objects from multiple levels.

In addition to duplicating multiple digital objects, the disclosed digital content distribution system optionally modifies the duplicated digital objects based on an API request. For instance, in some embodiments, the digital content distribution system receives an additional API request that identifies a duplicate digital object and an action to modify the duplicated digital object. By contrast, in some embodiments, a single API request identifies digital objects for duplication and digital objects to modify. The digital content distribution system then modifies the duplicated digital object according to the additional API request. For example, the digital content distribution system may change budgetary parameters, scheduling parameters, or audience parameters associated with a duplicate digital content set identified in an API request or additional API request.

Upon duplicating digital objects, the disclosed digital content distribution system optionally provides projected performance insights to a requesting client device. For example, in some embodiments, the digital content distribution system provides projected performance insights describing projected statistics for a duplicated digital content campaign with a given objective and given digital content sets and digital content items. The digital content distribution system provides such projected performance insights based on previous digital content campaigns having the same or similar objectives and other specifications.

The disclosed digital content distribution system overcomes many of the limits of conventional interfaces described above. Some conventional APIs, for example, limit a client device to duplication requests for only one or a few digital content items at a time. These conventional APIs may require a server and client to exchange numerous requests and responses to duplicate multiple digital objects on different levels. By processing an API request to duplicate multiple digital objects from different levels, the disclosed digital content distribution system provides an API that avoids the request-by-request duplication of digital objects that hinder existing interfaces and slow the processing of duplication requests.

Similarly, some conventional user interfaces include numerous menus, tools, and other options that a user must navigate through to select and identify different digital objects (e.g., digital content campaigns and digital content sets) and corresponding specifications to duplicate multiple digital objects. By using an API request to duplicate multiple digital objects from multiple digital-object levels, the disclosed digital content distribution system avoids the numerous menus, tools, and options that conventional interfaces force users to navigate to select and identify different digital objects for duplication. In sum, the disclosed digital content distribution system provides a unique API with protocols that simplify and reduce the computer processing to duplicate digital objects from multiple digital-object levels of a digital content account.

Turning now to the figures, FIG. 1 illustrates a block diagram of one embodiment of a system environment 100 in which a digital content distribution system 102 operates. In some embodiments, the digital content distribution system 102 is a social networking system, such as the social networking system described below with reference to FIG. 7. As illustrated in FIG. 1, the system environment 100 includes the digital content distribution system 102, implemented by one or more server(s) 104. The system environment 100 further includes client devices 108a-108n. As depicted in FIG. 1, each of the client devices 108a-108n have an associated user—with a user 112a associated with the client device 108a, a user 112b associated with the client device 108b, and a user 112n associated with the client device 108n. The users 112a-112n may be persons, organizations, or other entities. Although FIG. 1 illustrates a particular number of client devices 108a-108n and a particular number of associated users 112a-112n, the system environment 100 may include any number of client devices and any number of associated users.

In some embodiments, the digital content distribution system 102 maintains digital content accounts for the users 112a-112n. As used in this disclosure, the term "digital content account" refers to a user account that includes digital objects within or at different digital-object levels. A digital content account may include, for example, digital objects that a user created and/or distributed using the digital content distribution system 102. A digital account may also include linked financial-account information as well as credential information that provides access and privileges to users to manage digital objects associated with the account. In some embodiments, for example, a digital content account is a digital advertising account that includes digital advertisements and other associated digital objects for distribution by the digital content distribution system 102. By contrast, in some embodiments, a digital content account is a digital video account that includes digital videos and other associated digital objects for distribution by the digital content distribution system 102.

Relatedly, the term "digital object" refers to a digital structure within a digital content account. Digital objects may include, for instance, digital content campaigns, digital content sets, digital content items, and their associated specifications. The digital content distribution system 102 maintains digital objects for a digital content account within multiple "digital-object levels." In one such embodiment, for example, a digital content account may have three levels. A third level of the digital-object levels may include, for instance, digital content campaigns and their respective specifications, such as their respective campaign objectives. Each digital content campaign includes one or more digital content sets. A second level may include digital content sets and their respective specifications, such as their respective budgetary parameters, scheduling parameters, and audience parameters. Each digital content set includes one or more digital content items. Finally, a first level may include digital content items and their respective specifications, such as their respective creative content.

As used in this disclosure, the term "digital content campaign" refers to a collection of digital objects created or distributed as part of an objective. For example, a digital content campaign may include a digital advertising campaign that includes a collection of digital advertising sets and digital advertisements that the digital content distribution system 102 distributes to users of a social networking system. As another example, a digital content campaign may include a digital video campaign that includes a collection of digital video sets and digital videos that the digital content distribution system 102 distributes to users of a digital video service.

Relatedly, the term "digital content set" refers to a set of digital content items. For example, a digital content set may be a digital advertisement set of multiple digital advertisements distributed within a social networking system or digital video service. By contrast, a digital content set may be a digital video set of multiple digital videos distributed within a social networking system or digital video service. By contrast, the term "digital content item" refers to an item of digital visual media, such as a video or image. For example, a digital content item may include a digital advertisement that includes an image, text, and a hyperlink to a website. In some embodiments, the digital content distribution system 102 distributes such a digital advertisement as a post within a newsfeed of a social networking system. As another example, a digital content item may include a digital video and accompanying textual description of the video. In some embodiments, the digital content distribution system 102 distributes such a digital video by posting the digital video and accompanying textual description on a digital video service's website (e.g., by creating a webpage within the digital video service's website).

The digital content distribution system 102 creates, duplicates, and modifies digital objects within a digital content account based on communications with users 112a-112n through their associated client devices 108a-108n. The client devices 108a-108n communicate over a network 106 with the digital content distribution system 102, including the server(s) 104. This disclosure describes additional details related to the digital content distribution system 102 below with reference to FIGS. 6-7. The network 106 may represent a network or a collection of networks, such as the Internet, a corporate intranet, a local area network ("LAN"), or a combination of two or more such networks. The network 106 may also be any suitable network over which the client devices 108a-108n (or other components) access the digital content distribution system 102 (or vice versa).

As further shown in FIG. 1, the server(s) 104 can enable the various functions, features, processes, and methods described in this disclosure using, for example, instructions within the digital content distribution system 102. Additionally, or alternatively, the server(s) 104 coordinate with the client devices 108a-108n to perform or provide the various functions, features, processes, and methods described in more detail below. Although FIG. 1 illustrates a particular arrangement of the digital content distribution system 102, server(s) 104, network 106, and client devices 108a-108n, various additional arrangements are possible. For example, the digital content distribution system 102 and the server(s) 104 may directly communicate with the client devices 108a-108n and thus bypass the network 106.

Generally, the client devices 108a-108n can be any one of various types of client devices. For example, the client devices 108a-108n can be a mobile device (e.g., a smart phone), tablet, laptop computer, desktop computer, television, or any other type of computing device as further explained below with reference to FIG. 6. Similarly, the server(s) 104 can include one or more computing devices, including those explained below with reference to FIG. 6. Moreover, the server(s) 104, digital content distribution system 102, network 106, and client devices 108a-108n may communicate using any communication applications and technologies suitable for transporting data and/or communication signals, including any known communication technologies, devices, media, and protocols supportive of data communications.

As an overview of the system environment 100, the server(s) 104 provide the client devices 108a-108n access to the digital content distribution system 102 through the network 106. When the digital content distribution system 102 receives an API request from one of the client devices 108a-108n, the digital content distribution system 102 generally performs an action based on the API request and optionally sends a response over the network 106 to one of the client devices 108a-108n. For example, in some embodiments, the client device 108a-108n receive and send an API request identifying digital objects from the digital-object levels of a digital content account for duplication. The client devices 108a-108n may receive and send an API request through a content-management application.

As shown in FIG. 1, the client devices 108a-108n each include a content-management application—with a content-management application 110a installed on the client device 108a, a content-management application 110b installed on the client device 108b, and a content-management application 110n installed on the client device 108n. In some embodiments, the client devices 108a-108n communicate with the server(s) 104 of the digital content distribution system 102 via dedicated applications on the client devices 108a-108n—that is, the content-management applications 110a-110n.

Among other things, the content-management applications 110a-110n facilitate the presentation and exchange of API requests and responses. For example, in certain embodiments, the content-management applications 110a-110n respectively cause the client devices 108a-108n to send API requests to the digital content distribution system 102. In certain embodiments, the content-management applications 110a-110n include instructions that, when executed by the client devices 108a-108n, respectively cause the client devices 108a-108n to present a response from the digital content distribution system 102 to an API request. For example, after sending API requests for duplication of digital objects, the client device 108a-108n may present responses indicating identifiers for duplicated digital objects or session identifiers for duplication sessions.

Although FIG. 1 depicts the content-management applications 110a-110n as separate and standalone applications, in an alternative embodiment, the content-management applications 110a-110n are part of social networking applications (or vice versa). Regardless of whether the content-management applications 110a-110n are separate or part of social networking applications, in some embodiments, the content-management applications 110a-110n comprise web browsers, applets, or other software applications (e.g., native applications) available to the client devices 108a-108n.

Additionally, in some instances, the digital content distribution system 102 provides data packets including instructions that, when executed by the client devices 108a-108n, create or otherwise integrate content-management applications 110a-110n within an application or webpage. The digital content distribution system 102 not only provides data packets that support the content-management applications 110a-110n, but also communicate with and exchange data packets with their associated client devices 108a-108n in response to data packets sent by the client devices 108a-108n per instructions within the content-management applications 110a-110n.

To facilitate user interaction with the digital content distribution system 102, the content-management applications 110a-110n each optionally provide one or more graphical user interfaces associated with the digital content distribution system 102; receive indications of interactions of the users 112a-112n with the graphical user interfaces; and perform various requests, queries, or responses to other user input, such as presenting API requests and responses within the content-management applications 110a-110n.

Upon receiving an API request for duplication of digital objects from one of the client devices 108a-108n, the digital content distribution system 102 duplicates the digital objects from the digital-objects levels within a digital content account. For example, in some embodiments, the API request identifies a digital content set for duplication. Upon receiving the API request, the digital content distribution system 102 creates copies of the digital content set and other digital objects associated with the digital content set. The other digital objects may include, for instance, associated budgetary parameters, associated scheduling parameters, and associated audience parameters; a digital content item associated with the digital content set and the digital content item's creative content; and, similarly, an additional digital content item associated with the digital content set and an additional associated creative content. In this particular example, the digital content distribution system 102 duplicates each of these digital objects from digital-objects levels within a digital content account in response to the API request identifying the digital content set.

Figure 2A:
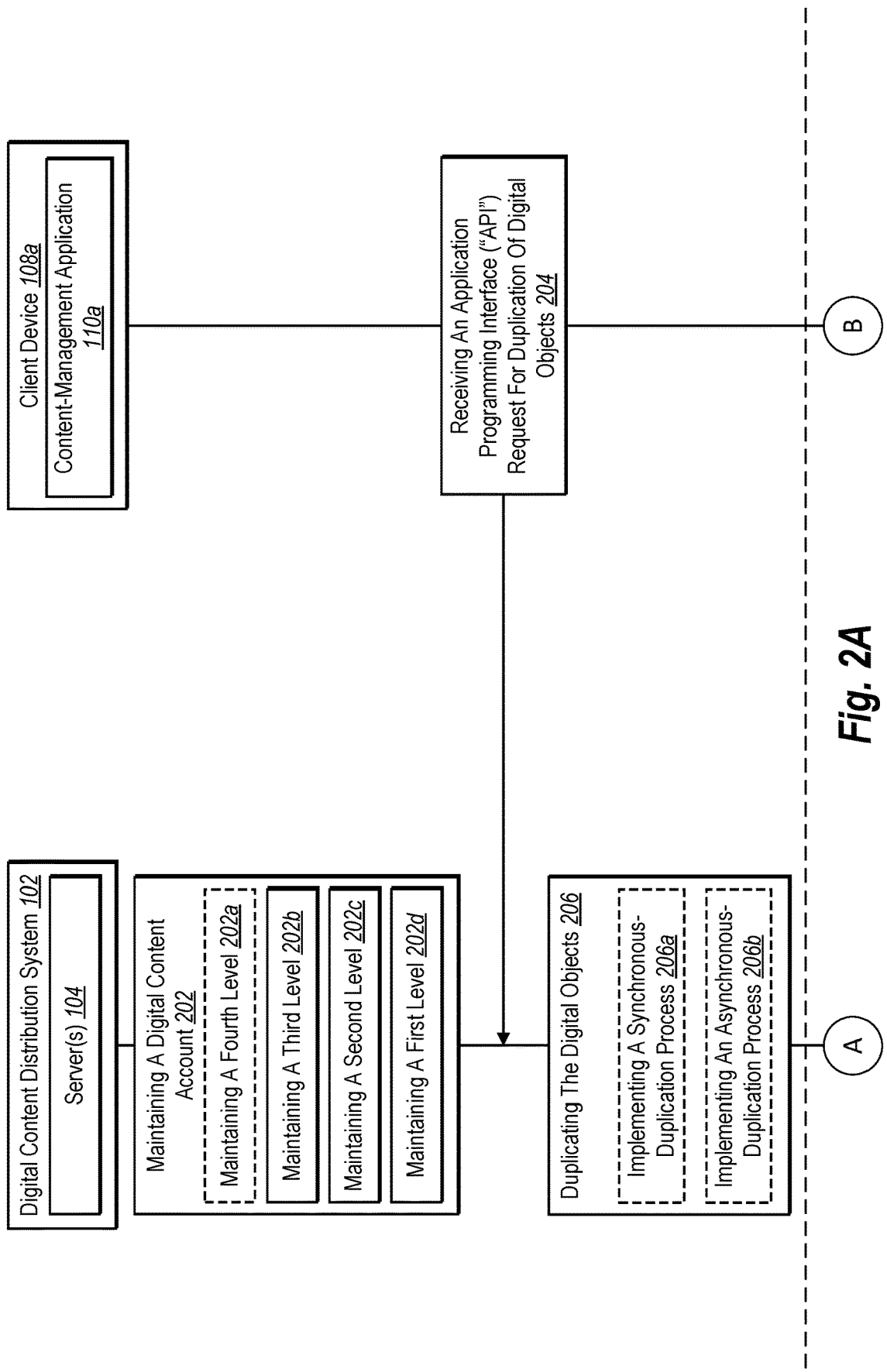
FIGS. 2A-2B illustrate sequence-flow diagrams of a digital content distribution system providing an application programming interface ("API") that facilitates requests and duplication of multiple associated digital objects from different levels of a digital content account in accordance with one or more embodiments.
Figure 2B:
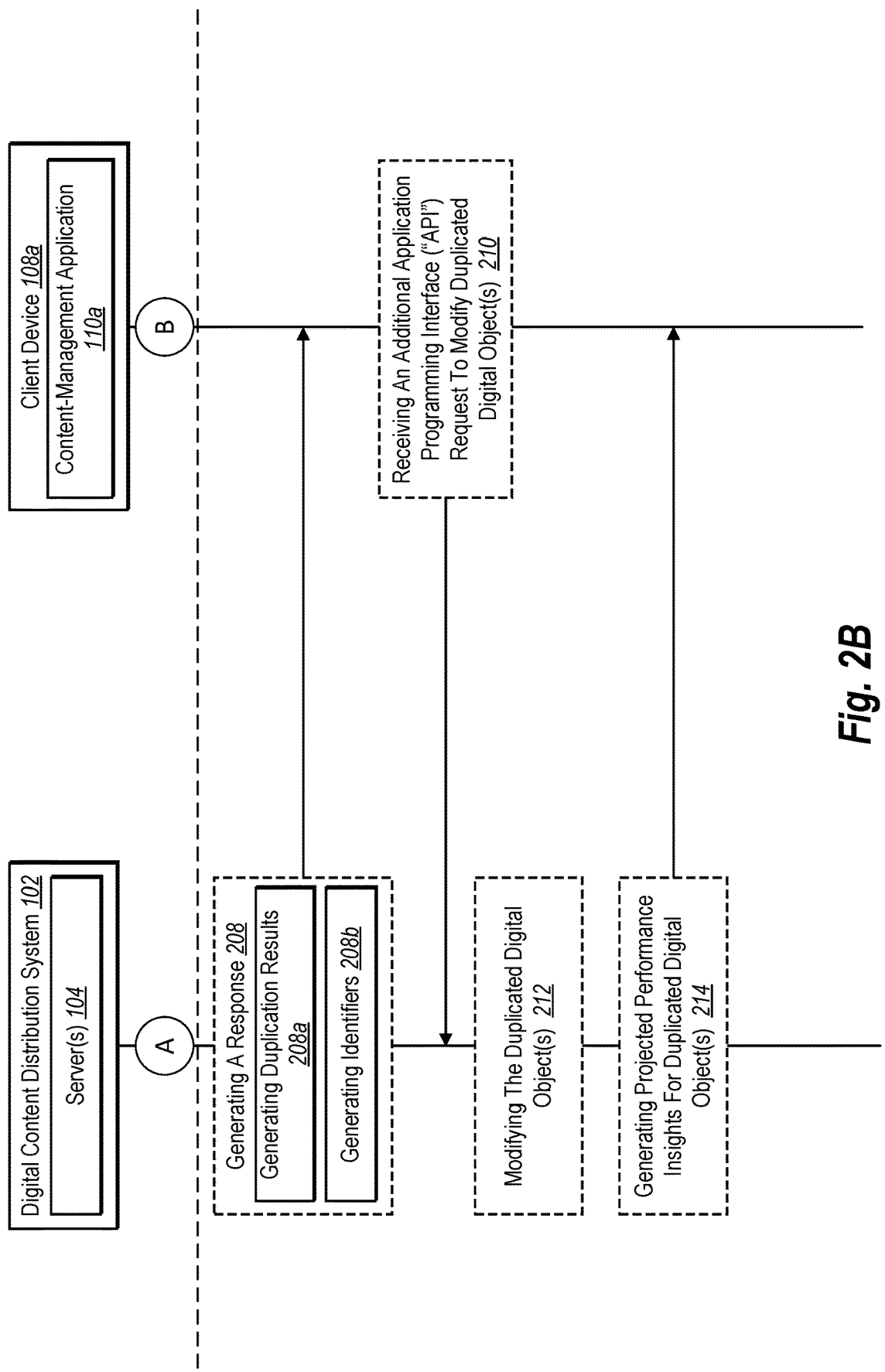

Turning now to FIGS. 2A-2B, these figures provide an overview of embodiments of the digital content distribution system 102 providing an API to facilitate requests for duplication and duplication of multiple associated digital objects from different levels of a digital content account in accordance with one or more embodiments. Specifically, FIGS. 2A-2B illustrate a sequence of acts 202-214 that the digital content distribution system 102 performs to maintain a digital content account, receive an API request for duplication of digital objects from digital-object levels of the digital content account, and duplicate the digital objects.

Various components of the system environment 100 perform the acts 202-214 shown in FIGS. 2A-2B. In some embodiments, for example, the digital content distribution system 102 comprises computer-executable instructions that cause the server(s) 104 to perform one or more of the acts 202-214. Similarly, in some embodiments, the content-management application 110a comprises computer-executable instructions that cause the client device 108a to perform one or more of the acts 202-214. Rather than repeatedly describe the instructions within the digital content distribution system 102 or within the content-management application 110a as respectively causing the server(s) 104 or the client device 108a to perform certain acts, this disclosure primarily describes the digital content distribution system 102 or the client device 108a as performing the acts 202-214 as a shorthand for those relationships.

Turning back now to FIG. 2A, as shown, the digital content distribution system 102 performs the act 202 of maintaining a digital content account. The digital content account includes different types of digital objects at different levels. For example, in some embodiments, the digital content account includes digital advertising objects at different levels. By contrast, in some embodiments, the digital content account includes digital video objects at different levels. Regardless of the type of digital content account, the account may include a number of different digital-object levels. For purposes of explanation, FIG. 2A illustrates four different digital-object levels in the acts 202a-202d.

As shown in FIG. 2A, the digital content distribution system 102 optionally performs the act 202a of maintaining a fourth level. The fourth level of the digital-object levels includes one or more digital content accounts and their respective specifications. For example, the user 112a may have access to multiple digital advertisement accounts maintained by the digital content distribution system 102 for different customers. Alternatively, the user 112a may have access to multiple digital video or advertisement accounts maintained by the digital content distribution system 102 for subsidiaries of a customer. Each digital content account includes a specification, such as credential information for users with access to a digital content account. For example, the credential information may include usernames, passwords, management privileges for managing a given digital content account and its contents. Each digital content account also includes one or more digital content campaigns maintained on a third level of digital-object levels.

As FIG. 2A suggests, in some embodiments, an API request identifies a digital content account for duplication. This API request triggers the digital content distribution system 102 to duplicate a digital content account and associated digital objects on multiple digital-object levels. For instance, the digital content distribution system 102 may duplicate digital objects (associated with an identified digital content account) from the fourth, third, second, and first levels.

As further shown in FIG. 2A, the digital content distribution system 102 performs the act 202b of maintaining a third level. The third level of the digital-object levels includes one or more digital content campaigns and their respective specifications. A specification for a digital content campaign may include, for example, a campaign objective or a buying type. This disclosure provides examples of campaign objectives and buying types below with reference to FIGS. 3A-3B. Regardless of its specification, each digital content campaign includes one or more digital content sets maintained on a second level of digital-object levels.

In addition to a third level, the digital content distribution system 102 performs the act 202c of maintaining a second level. The second level of the digital-object levels includes one or more digital content sets and their respective specifications. A specification for a digital content set may include, for example, budgetary parameters, scheduling parameters, and audience parameters. This disclosure provides examples of budgetary parameters, scheduling parameters, audience parameters, and other specification parameters for a digital content set below with reference to FIGS. 3A-3B. Regardless of its specification, each digital content set includes one or more digital content items maintained on a first level of digital-object levels.

As further shown in FIG. 2A, the digital content distribution system 102 performs the act 202d of maintaining a first level. The first level of the digital-object levels includes one or more digital content items and their respective specifications. A specification for a digital content item may include, for instance, a digital content name, a content-provider identity, creative content, and tracking parameters. This disclosure provides examples of digital content names, identities, creative content, and tracking parameters below with reference to FIGS. 3A-3B.

In addition to maintaining a digital content account that includes digital-object levels, the digital content distribution system 102 also receives an API request for duplication of multiple digital objects. As shown in FIG. 2A, the client device 108a performs the act 204 of receiving an application programming interface ("API") request for duplication of digital objects. As indicated by the arrow associated with the act 204, the client device 108a also sends (and the digital content distribution system 102 receives) the API request for duplication of digital objects.

As indicated above, in some embodiments, the client device 108a receives an API request that identifies digital objects from the digital-object levels for duplication. For example, in some embodiments, the API request includes a digital-object identifier for a digital object. The digital-object identifier may be, for example, an account identifier for a digital content account, a campaign identifier for a digital content campaign, or a set identifier for a digital content set.

In addition to a digital-object identifier, in some embodiments, the API request includes a duplication parameter indicating a request to duplicate additional digital objects associated with the digital object identified in the request. The duplication parameter prompts the digital content distribution system 102 to duplicate digital objects associated with the digital object identified in the request from various digital-object levels. For example, a duplication parameter may encode a prompt for the digital content distribution system 102 to duplicate some or all digital objects both (a) associated with a digital object identified by a digital-object identifier and (b) on the same or lower level as the digital object. This disclosure provides an example of a duplication parameter below with reference to FIG. 4.

In addition to a digital-object identifier and a duplication parameter, in certain embodiments, the API request identifies a re-parenting digital object. The re-parenting digital object represents an existing digital object with which the digital content distribution system 102 associates copies of duplicated digital objects. For example, when an API request identifies digital content sets to duplicate, the API request may also identify an existing digital content campaign as the re-parenting digital object to which the digital content distribution system 102 will associate the duplicated digital content sets. Similarly, when an API request identifies digital content items to duplicate, the API request may also identify an existing digital content set as the re-parenting digital object to which the digital content distribution system 102 will associate the duplicated digital content items. This disclosure provides an example of a re-parenting digital object below with reference to FIG. 4.

Regardless of the contents of an API request, in certain embodiments, the API request includes a draft identifier. When an API request includes a draft identifier, the digital content distribution system 102 attaches the draft identifier to duplicated digital objects created by the digital content distribution system 102. For example, when an API request identifies a digital content campaign and includes a draft identifier, the digital content distribution system 102 attaches the draft identifier to a copy of the digital content campaign and the associated copies of digital objects that the digital content distribution system 102 creates.

After receiving the API request for duplication of digital objects, the digital content distribution system 102 duplicates associated digital objects from the digital-object levels. As shown in FIG. 2A, the digital content distribution system 102 performs the act 206 of duplicating the digital objects. As suggested above, the API request triggers the digital content distribution system 102 to duplicate associated digital objects from multiple digital-object levels.

In some embodiments, for example, the digital content distribution system 102 duplicates a digital content set and associated digital objects from multiple digital-object levels in response to a particular API request. In this example, the particular API request identifies the digital content set and a duplication parameter. Upon receiving the API request, the digital content distribution system 102 determines that the duplication parameter indicates duplicating the digital content set and associated digital objects on the same or lower level as the digital content set.

Per the API request, the digital content distribution system 102 creates copies of the digital content set and other digital objects associated with the digital content set. The other duplicated digital objects may include, for instance, budgetary parameters, scheduling parameters, and audience parameters within the second level associated with the digital content set; a digital content item and associated creative content within the first level; and an additional digital content item and additional associated creative content within the first level. The digital content distribution system 102 duplicates the digital objects listed above in part because each digital object is associated with the digital content set identified in the API request.

As another example, in certain embodiments, the digital content distribution system 102 duplicates a digital content campaign and associated digital objects from multiple digital-object levels in response to a selective API request. The selective API request identifies (a) the digital content campaign, (b) some (but not all) digital content sets associated with the digital content campaign, and (c) digital content items associated with the identified digital content sets. For instance, in certain embodiments, the API request identifies a campaign identifier for the digital content campaign, set identifiers for the associated digital content sets, and item identifiers for the associated digital content items. Upon receiving the API request, the digital content distribution system 102 determines that the API request identifies only selective digital objects associated with the digital content campaign.

Per the selective API request, the digital content distribution system 102 creates copies of the digital content campaign and other digital objects associated with the digital content campaign and identified by the API request. The other duplicated digital objects may include, for instance, a campaign objective within the third level associated with the digital content campaign; a first digital content set, first associated budgetary parameters, first associated scheduling parameters, and first associated audience parameters within the second level; a first digital content item, a first associated creative content, a second digital content item, and a second associated creative content within the first level; a second digital content set, second associated budgetary parameters, second associated scheduling parameters, and second associated audience parameters within the second level; and a third digital content item, a third associated creative content, a fourth digital content item, and a fourth associated creative content within the first level. The digital content distribution system 102 duplicates the digital objects listed above in part because each digital object is associated with the digital content campaign or another digital object identified in the selective API request.

As further shown in FIG. 2A, the digital content distribution system 102 optionally duplicates digital objects using a synchronous-duplication process or an asynchronous-duplication process. In some cases, the digital content distribution system 102 optionally performs the act 206a of implementing a synchronous-duplication process. When performing the act 206a, the digital content distribution system 102 duplicates digital objects using one or more servers that implement a synchronous-duplication process with memory restrictions and time restrictions for duplication. For example, the one or more servers may implement a synchronous-duplication process in response to an API request by duplicating digital objects from digital-object levels when the duplication requires up to certain megabyte or gigabyte limits of memory (e.g., a limit of 400 MB) and certain time limits to complete duplication (e.g., a limit of 30 seconds to complete).

Alternatively, the digital content distribution system 102 performs the act 206b of implementing an asynchronous-duplication process. When performing the act 206b, the digital content distribution system 102 duplicates digital objects using one or more servers that implement an asynchronous-duplication process with duplication sessions. For example, the one or more servers may implement an asynchronous-duplication process in response to an API request by duplicating digital objects from digital-object levels when the duplication requires more than a certain megabyte or gigabyte limit of memory (e.g., more than 400 MB) or more than a certain time limit to complete duplication (e.g., more than 30 seconds). In some embodiments, the digital content distribution system 102 duplicates the digital objects in different duplication sessions. In other words, the digital content distribution system 102 schedules one or more servers to duplicate digital objects identified in the API request in different duplication sessions according to the servers' availability.

In some embodiments, the digital content distribution system 102 receives API requests that include synchronous parameters or asynchronous parameters. Synchronous parameters indicate to the digital content distribution system 102 to use a synchronous-duplication process for duplication. By contrast, asynchronous parameters indicate to the digital content distribution system 102 to use an asynchronous-duplication process for duplication. FIG. 4 below includes an example of an asynchronous parameter.

In certain embodiments, when the digital content distribution system 102 receives an API request for duplication including a synchronous parameter from the client device 108a, the digital content distribution system 102 determines that the duplication process exceeds either or both of the synchronous-duplication process's memory restrictions and time restrictions. The digital content distribution system 102 subsequently sends a response to the client device 108a prompting the user 112a to send an API request with an asynchronous parameter. In certain embodiments, regardless of whether a preceding API request includes a synchronous parameter, the digital content distribution system 102 sends a response to the client device 108a prompting the user 112a to send an API request with an asynchronous parameter.

Turning now to FIG. 2B, in addition to duplicating digital objects, the digital content distribution system 102 optionally performs the act 208 of generating a response. As indicated by the arrow associated with the act 208, the digital content distribution system 102 also sends (and the client device 108a receives) the response. For example, the digital content distribution system 102 optionally sends (and the client device 108a receives) data packets comprising data encoding for a response indicating duplication results or identifiers. The digital content distribution system 102 may send the response either before or after duplicating the digital objects.

The response may take a variety of forms. For example, as shown in FIG. 2B, the digital content distribution system 102 optionally performs the act 208a of generating duplication results. In some such embodiments, the digital content distribution system 102 generates (and sends to the client device 108a) a response confirming duplication of the digital objects identified by the API request for duplication. By contrast, in some embodiments, the digital content distribution system 102 generates (and sends to the client device 108a) a response indicating an error in duplication (e.g., when the API request is improperly formatted).

As further shown in FIG. 2B, the digital content distribution system 102 optionally performs the act 208b of generating identifiers. For example, in some embodiments, the digital content distribution system 102 generates (and sends to the client device 108a) a response indicating identifiers for the duplicate digital objects. Such identifiers may include account identifiers for duplicated digital content accounts, campaign identifiers for duplicated digital content campaigns, set identifiers for duplicated digital content sets, and/or item identifiers for duplicated digital content items. As indicated above, in some embodiments, the API request includes a draft identifier that the digital content distribution system 102 includes in the response.

Additionally, or alternatively, when performing the act 208b, the digital content distribution system 102 optionally generates (and sends to the client device 108a) a response indicating one or more session identifiers for duplication sessions. When implementing an asynchronous-duplication process, in certain embodiments, the digital content distribution system 102 sends a session identifier that corresponds to a duplication session for duplicating the digital objects identified in the API request. The user 112a may subsequently send an additional API requesting the status of a duplication session using the session identifier. In some instances, the digital content distribution system 102 initially sends a response with a session identifier and then—after completing duplication of the digital objects identified in the API request—sends an additional response with digital-object identifiers for the duplicate digital objects.

In addition to generating a response, the digital content distribution system 102 may also modify duplicated digital objects in response to additional API requests. As shown in FIG. 2B, for example, the client device 108a optionally performs the act 210 of receiving an additional application programming interface request to modify duplicated digital object(s). As indicated by the arrow associated with the act 208, the client device 108a also sends (and the digital content distribution system 102 receives) the additional API request to modify duplicated digital object(s). While this disclosure describes the act 210 of receiving an additional API request to modify duplicated digital object(s), in some embodiments, an initial API request may include conversion parameters for modifying duplicated digital object(s).

An additional API request to modify duplicated digital object(s) may take a variety of forms. The additional API request may, for example, request to modify any part of a duplicated digital object's specification. For example, the additional API request may request to modify a name or a digital-object identifier of a duplicated digital object; a campaign objective or a buying type of a digital content campaign; budgetary parameters, scheduling parameters, or audience parameters for digital content set; or a content-provider identity, creative content, or tracking parameter for a digital content item. In other words, the additional API request may identify any part of a duplicated digital object to modify.

After receiving the additional API request, the digital content distribution system 102 modifies the duplicated digital object according to the additional API request. As further shown in FIG. 2B, the digital content distribution system 102 optionally performs the act 212 of modifying the duplicated digital object(s). The digital content distribution system 102 modifies duplicated digital objects per the instructions in the additional API request.

For example, when the additional API request identifies a duplicated digital content set and requests to modify associated budgetary parameters, the digital content distribution system 102 modifies the associated budgetary parameters per the additional API request (e.g., by increasing or decreasing a daily or monthly monetary budget for the duplicated digital content set). As another example, when the additional API request identifies a duplicated digital content item and requests to modify associated creative content, the digital content distribution system 102 modifies the associated creative content per the additional API request (e.g., by replacing a text of the duplicated digital content item).

In addition to modifying duplicated digital objects, in some embodiments, the digital content distribution system 102 provides projected performance insights for duplicated digital objects. As shown in FIG. 2B, the digital content distribution system 102 optionally performs the act 214 of generating projected performance insights for duplicated digital object(s). As indicated by the arrow associated with the act 214, the digital content distribution system 102 also sends (and the client device 108a receives) the projected performance insights for duplicated digital objects.

For example, in some embodiments, the digital content distribution system 102 provides projected performance insights describing projected statistics for a duplicated digital content campaign with a given campaign objective and given digital content sets and digital content items. The digital content distribution system 102 may project statistics, for instance, for conversions, product-catalog sales, store visits, or any other campaign objective based on the specification of the duplicated digital content campaign. In some embodiments, the projected performance insights may be in the form of a projected range (e.g., a projected range of conversions per day or store visits per month).

To project performance insights, the digital content distribution system 102 relies on previous digital objects having the same or similar specifications. For example, the digital content distribution system 102 projects daily or monthly conversions, product-catalog sales, store visits, or another campaign objective based on digital content campaigns having the same or similar campaign objectives and other specifications. The digital content distribution system 102 may use statistics for the digital content campaign that was duplicated, for example, to project performance insights for its duplicate.

Figure 3A:
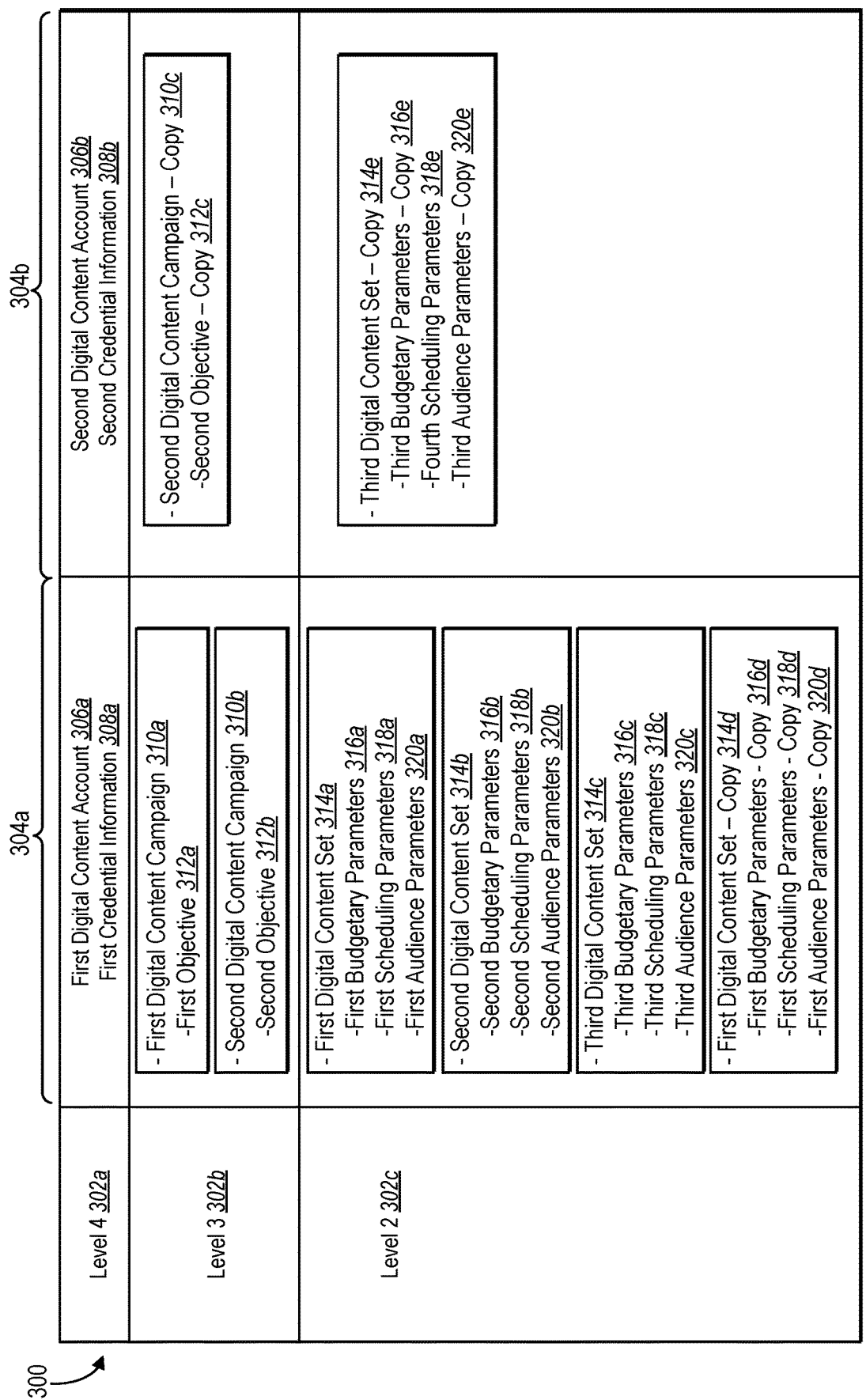
FIGS. 3A-3B illustrate digital-object levels of digital content accounts in accordance with one or more embodiments.
Figure 3B:
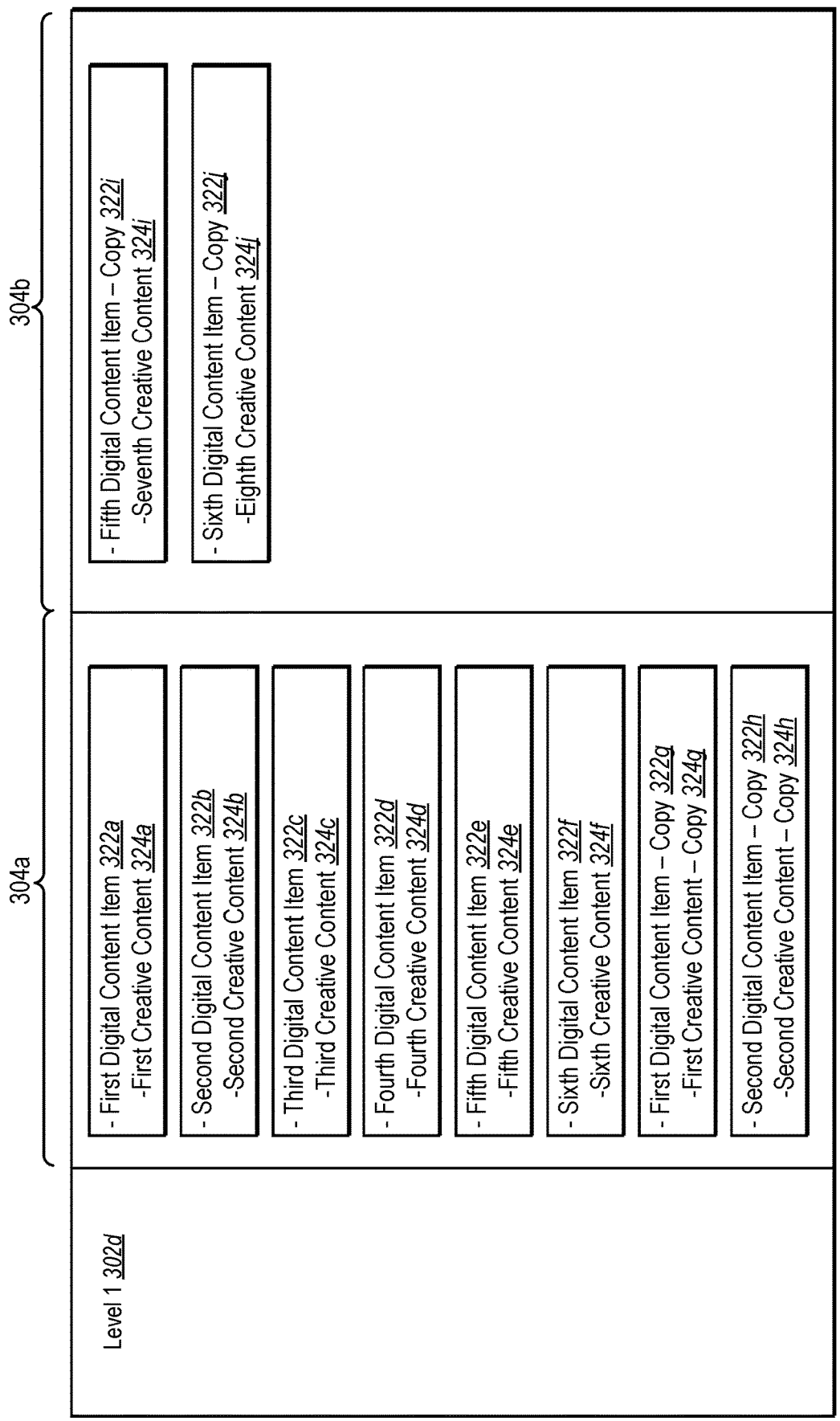

Turning now to FIGS. 3A-3B, these figures illustrate digital-object levels 300 of a couple digital content accounts. As shown, each of the digital count accounts include four different levels of digital objects. In particular, the digital-object levels 300 include a fourth level 302a, a third level 302b, a second level 302c, and a first level 302d. As explained below, FIGS. 3A-3B also depict digital objects from different levels that the digital content distribution system 102 duplicates in response to different API requests for duplication. The following paragraphs describe each of the digital-object levels 300 and an embodiment of the digital content distribution system 102 duplicating digital objects from different levels.

As shown in FIG. 3A, the fourth level 302a includes a first digital content account 306a, a second digital content account 306b, and each of their respective specifications. In this embodiment, the digital content distribution system 102 associates first credential information 308a as part of the first digital content account 306a's specification and second credential information 308b as part of the second digital content account 306b's specification. Credential information may include, for example, usernames, passwords, and/or management privileges for users who manage or have access to the first digital content account 306a or the second digital content account 306b. The management privileges define roles and privileges to alter digital objects for a given digital content account.

Although not shown, the first digital content account 306a and the second digital content account 306b's specifications may also include other account specific information, such as account settings or linked financial accounts from which to draw payment. Additionally, as their names suggest, the first and second credential information 308a and 308b may each include different usernames, passwords, management privileges, or other specifications. Alternatively, in some embodiments, the first and second credential information 308a and 308b may each include the same usernames, passwords, management privileges, or other specifications copied from one digital content account to another.

The first and second digital content accounts 306a and 306b each include associated digital objects within the third level 302b, the second level 302c, and the first level 302d. As shown in FIGS. 3A and 3B, column 304a includes digital objects associated with the first digital content account 306a, and column 304b includes digital objects associated with the second digital content account 306b. For example, each of the first and second digital content accounts 306a and 306b include digital content campaigns within the third level 302b. Specifically, the first digital content account 306a includes a first digital content campaign 310a and a second digital content campaign 310b. By contrast, the second digital content account 306b includes a duplicate second digital content campaign 310c.

As shown in FIG. 3A, the third level 302b includes digital content campaigns 310a-310c and each of their respective specifications. Each of the digital content campaigns 310a-310c include a campaign objective as part of their specifications. In particular, the digital content distribution system 102 associates a first campaign objective 312a with the first digital content campaign 310a, a second campaign objective 312b with the second digital content campaign 310b, and a duplicate second campaign objective 312c with the duplicate second digital content campaign 310c.

A campaign objective may be one of a variety of objectives. For example, a campaign objective may include, but is not limited to, increasing or generating awareness (e.g., increasing awareness of a brand by number of views of digital content items), reach (e.g., increasing the number of unique users exposed to digital content items), website traffic (e.g., generating more visits to a website based on digital content items), application installations (e.g., increasing a number of times a mobile application is downloaded), video views (e.g., increasing a number of users who viewed a video for a threshold amount of time), lead generation (e.g., increasing a number of users who provide an advertiser or digital content provider an email address, phone number, address, or other contact information), post engagement (e.g., increasing a number of clicks, likes, shares, or comments for a post on a social media page), social-media-page likes (e.g., increasing a number of unique users who like a social media page), event responses (e.g., increasing a number of users who respond to an event or meeting request), conversions (e.g., increasing a number of users who navigate to a particular web page from a digital content item), product-catalog sales (e.g., increasing a number of sales from a product catalog on a website or social networking system), or store visits (e.g., increasing the number of visits to a physical store based on digital content items).

Although not shown in FIG. 2A, a digital content campaign may also include a buying type as part of its specification. A buying type represents a method by which a user pays for and strategically places digital content items as part of a digital content campaign. A buying type may include, for example, auction bidding (e.g., bidding a price in an auction where the user who bids the highest price is awarded placement for a digital content item), fixed-price bidding (e.g., bidding a fixed price for placement of a digital content item until the user reaches a target number of placements), or reach and frequency buying (e.g., buying a set number of digital-content-item placements in advance at predictable prices).

Regardless of a digital content campaign's specification, each of the digital content campaigns 310a-310c include one or more digital content sets. As suggested by FIG. 3A, the first digital content campaign 310a includes a first digital content set 314a and a second digital content set 314b. The second digital content campaign 310b includes a third digital content set 314c and a duplicate first digital content set 314d. The duplicate second digital content campaign 310c includes a duplicate third digital content set 314e.

As shown in FIG. 3A, the second level 302c includes the digital content sets 314a-314e and each of their respective specifications. Each of the digital content sets 314a-314e include associated budgetary parameters, scheduling parameters, and audience parameters as part of their specifications. In particular, the digital content distribution system 102 associates first budgetary parameters 316a, first scheduling parameters 318a, and first audience parameters 320a with the first digital content set 314a; second budgetary parameters 316b, second scheduling parameters 318b, and second audience parameters 320b with the second digital content set 314b; third budgetary parameters 316c, third scheduling parameters 318c, and third audience parameters 320c with the third digital content set 314c; duplicate first budgetary parameters 316d, duplicate first scheduling parameters 318d, and duplicate first audience parameters 320d with the duplicate first digital content set 314d; and duplicate third budgetary parameters 316e, fourth scheduling parameters 318e, and duplicate third audience parameters 320e with the duplicate third digital content set 314e.

As the name suggests, budgetary parameters may include, but are not limited to, a daily, monthly, or yearly monetary budget for distributing digital content items. By contrast, scheduling parameters may include, but are not limited to, a schedule for distributing digital content items, such as dates or times within which the digital content distribution system 102 distributes digital content items (within a digital content set) on webpages, newsfeeds, or other digital forums. Audience parameters, on the other hand, include, but are not limited to, a demographic group and geographic location to which the digital content distribution system 102 distributes digital content items. Audience parameters may include a demographic group by age, sex, ethnicity, or other category and a geographic location by country, city, state, or other region. Audience parameters may further include languages or interests of audience members to which the digital content distribution system 102 distributes digital content items.

Although not shown, a digital content set may also include a placement type as part of its specification. A placement type may include automatic placements or selective placements. When selected by a user, the automatic-placements type triggers the digital content distribution system 102 to distribute digital content items to users who satisfy audience parameters in a default set of digital forums. A default set of digital forums may include, for example, multiple social networks (e.g., FACEBOOK and INSTAGRAM) and web sites or software applications to which the digital content distribution system 102 distributes digital content items. By contrast, when selected by a user, a selective-placements type triggers the digital content distribution system 102 to distribute digital content items to users who satisfy audience parameters in a selected set of digital forums.

Regardless of a digital content set's specification, each of the digital content sets 314a-310e include one or more digital content items. As suggested by FIGS. 3A-3B, the first digital content set 314a includes a first digital content item 322a and a second digital content item 322b. The second digital content set 314b includes a third digital content item 322c and a fourth digital content item 322d. The third digital content set 314c includes a fifth digital content item 322e and a sixth digital content item 322f. The duplicate first digital content set 314d includes a duplicate first digital content item 322g and a duplicate second digital content item 322h. The duplicate third digital content set 314e includes a duplicate fifth digital content item 322i and a duplicate sixth digital content item 322j.

As shown in FIG. 3B, the first level 302d includes the digital content items 322-322j and each of their respective specifications. Each of the digital content items 322a-322j include associated creative content as part of their specifications. In particular, the digital content distribution system 102 associates first creative content 324a with the first digital content item 322a; second creative content 324b with the second digital content item 322b; third creative content 324c with the third digital content item 322c; fourth creative content 324d with the fourth digital content item 322d; fifth creative content 324e with the fifth digital content item 322e; and sixth creative content 324f with the sixth digital content item 322f. Similarly, the digital content distribution system 102 associates duplicate first creative content 324g with the duplicate first digital content item 322g; duplicate second creative content 324h with the duplicate second digital content item 322h; seventh creative content 324i with the duplicate fifth digital content item 322i; and eighth creative content 324j with the duplicate sixth digital content item 322j.

The creative content 324a-324j may include a variety of components. Creative content may include, but is not limited to, an image, a video, a link, and/or a text associated with a particular digital content item. Each of these components represent a visual that users view when the digital content distribution system 102 distributes a digital content item. For example, a digital content item's creative content may include an image, text, and a hyperlink to a web site as part of a digital advertisement. As another example, a digital content item's creative content may include a digital video and accompanying textual description of the video shown on a webpage of a digital video service.

In addition to creative content, in some embodiments, a digital content item's specification includes a content-provider identity. A content-provider identity may specify, for example, a person, firm, or organization on whose behalf the digital content distribution system 102 distributes the digital content item. The person, firm, or organization may be a company for whom the digital content distribution system 102 distributes a digital advertisement or digital video. A content-provider identity may also specify a social network account connected to a digital content item, such as a FACEBOOK page or an INSTAGRAM account.

Beyond creative content or a content-provider identity, in some embodiments, a digital content item's specification also includes tracking parameters. Tracking parameters include settings that indicate whether a digital content item includes a tracking pixel. A tracking pixel is a pixel or a code that the digital content distribution system 102 attaches to a digital content item. The digital content distribution system 102 then tracks the pixel or code in a viewer's browser as the viewer navigates from the digital content item to a webpage or series of webpages.

As indicated above, FIGS. 3A-3B also illustrate digital objects from different levels that the digital content distribution system 102 duplicates in response to different API requests for duplication. For example, as suggested by FIGS. 3A-3B, the digital content distribution system 102 receives a first API request. The first API request identifies digital objects for duplication with a digital-object identifier, a re-parenting digital object with a re-parenting parameter, digital-object levels from which to duplicate digital objects with a duplication parameter, and modifications to duplicate digital objects with conversion parameters.

Specifically, the first API request identifies the second digital content campaign 310b for duplication with a campaign identifier. The first API request also identifies the second digital content account 306b as a re-parenting digital object with a re-parenting parameter and an account identifier—indicating that the second digital content account 306b will be the re-parenting digital object for a duplicate of the second digital content campaign 310b. The first API request also includes a duplication parameter indicating a request to duplicate digital objects associated with the second digital content campaign 310b within the third level 302b, the second level 302c, and the first level 302d.

By contrast, the first API request's conversion parameters indicate replacing a duplicate of the third scheduling parameters 318c (for the duplicate of the third digital content set 314c) with the fourth scheduling parameters 318e; replacing a duplicate of the fifth creative content 324e (for the duplicate of the fifth digital content item 322e) with the seventh creative content 324i; and replacing a duplicate of the sixth creative content 324f (for the duplicate of the sixth digital content item 322f) with the eighth creative content 324j.

After receiving the first API request, the digital content distribution system 102 duplicates digital objects according to the first API request. In general, the digital content distribution system 102 duplicates digital objects identified by the campaign identifier from different digital-object levels identified by the duplication parameter, associates the duplicate digital objects with the re-parenting digital object, and creates new digital objects to replace would-be duplicate digital objects per the conversion parameters. In particular, the digital content distribution system 102 creates the duplicate second digital content campaign 310c and the associated duplicate second campaign objective 312c; the duplicate third digital content set 314e and the associated duplicate third budgetary parameters 316e, fourth scheduling parameters 318e, and duplicate third audience parameters 302e; the duplicate fifth digital content item 322i and the associated seventh creative content 324i; and the duplicate sixth digital content item 322j and the associated eighth creative content 324j. The digital content distribution system 102 associates each of these digital objects with the second digital account 306b based on the first API request's re-parenting parameter and account identifier.

As further suggested by FIGS. 3A-3B, the digital content distribution system 102 receives a second API request. The second API request identifies the first digital content set 314a for duplication with a set identifier. The second API request further includes a duplication parameter indicating a request to duplicate digital objects associated with the first digital content set 314a within the second level 302c and the first level 302d.

After receiving the second API request, the digital content distribution system 102 duplicates the digital objects identified by the set identifier and the duplication parameter. In particular, the digital content distribution system 102 creates the duplicate first digital content set 314d and the associated duplicate first budgetary parameters 316d, the duplicate first scheduling parameters 318d, and the duplicate first audience parameters 320d; the duplicate first digital content item 322g and its associated duplicate first creative content 324g; and the duplicate second digital content item 322h and its associated duplicate second creative content 324h.

The duplications described above are merely examples. In additional embodiments, the digital content distribution system 102 duplicates a different set of digital objects from different digital-object levels in response to API requests with different configurations. FIG. 4 depicts an example of an API request with a different configuration. In particular, FIG. 4 illustrates an API duplication request 402 from the client device 108a and an API response 404 from the digital content distribution system 102.

As shown in FIG. 4, the API duplication request 402 includes request parameters 406. The request parameters 406 indicate digital objects from digital-object levels for the digital content distribution system 102 to duplicate. For example, the request parameters 406 include digital-object-duplication parameters 408 that identify a digital object for duplication. In particular, the digital-object-duplication parameters 408 includes a digital-object identifier that identifies the digital object for duplication. In this embodiment, the digital-object identifier identifies a digital content set. The request parameters 406 further include draft parameters 410 that include a draft identifier for the digital content distribution system 102 to attach to the duplicate digital objects it creates.

In addition to the digital-object-duplication parameters 408 and the draft parameters 410, the request parameters 406 include re-parenting parameters 412. The re-parenting parameters 412 identify a re-parenting digital object by digital-object identifier (or re-parenting identifier). The digital content distribution system 102 associates the re-parenting digital object with the duplicate of the digital object corresponding to the digital-object identifier in the digital-object-duplication parameters 408.

Besides the re-parenting parameters 412, the request parameters 406 also include duplication parameters 414. The duplication parameters 414 indicate a type of duplication process that duplicates digital objects associated with the digital object identified in the digital-object-duplication parameters 408 (here, a digital content set). As shown, the duplication parameters 414 indicate to the digital content distribution system 102 to duplicate digital objects that are (a) associated with the digital object identified in the digital-object-duplication parameters 408 and (b) within the same or lower level of digital-object levels as the with the digital object identified in the digital-object-duplication parameters 408.

As further shown in FIG. 4, the API duplication request 402 also includes result parameters 416. The result parameters 416 generally indicate a digital content account and request type for the digital content distribution system 102 to process. For example, the result parameters 416 include asynchronous parameters 420. The asynchronous parameters 420 include an account identifier 418 indicating a digital content account to which the API duplication request 402 pertains. The asynchronous parameters 420 also indicate that the API duplication request 402 is for duplication by an asynchronous-duplication process.

As further shown in FIG. 4, in addition to the asynchronous parameters 420, the result parameters 416 also include call-type parameters 422 that indicate a call type for the API duplication request 402. As shown, the call-type parameters 422 indicate a "POST" call type for the digital content distribution system 102 to process. Additionally, the result parameters 416 further include a request-parameters reference 424. The request-parameters reference 424 refer back to and incorporate the request parameters 406 into the "POST" request. Finally, the result parameters 416 include credential parameters 425 that include credential information and a token to access the identified digital content account.

After receiving the API duplication request 402 from the client device 108a, the digital content distribution system 102 duplicates digital objects from multiple digital-object levels according to the request parameters 406 and the result parameters 416. In some embodiments, the digital content distribution system 102 sends the API response 404 back to the client device 108a. FIG. 4 depicts one such response with information that corresponds to the API duplication request 402. As shown in FIG. 4, the API response 404 includes a draft identifier 426. The draft identifier 426 corresponds to the duplicate digital objects created by the digital content distribution system 102 in response to the API duplication request 402.

As further shown in FIG. 4, the API response 404 also includes digital-object identifiers 428a-428c. The digital-object identifiers 428a-428c correspond to either re-parenting digital objects or duplicate digital objects—the latter of which the digital content distribution system 102 creates in response to the API duplication request 402. In particular, the digital-object identifier 428a corresponds to a re-parenting digital object to which the digital content distribution system 102 associates the duplicate digital objects. As indicated in FIG. 4, the re-parenting digital object is a digital content campaign. By contrast, the digital-object identifier 428b corresponds to a duplicate digital content set. The digital content set represents a duplicate of the digital content set identified in the digital-object-duplication parameters 408. Finally, the digital-object identifier 428c corresponds to a duplicate digital content item. As suggested above, the duplicate digital content item is associated with the duplicate digital content set corresponding to the digital-object identifier 428b.

FIG. 4 illustrates merely one example of an API request that identifies digital objects from digital-object levels for duplication. As indicated above, such API requests may include different parameters and identify different types of digital objects for duplication. For example, an API request my further include conversion parameters that indicate modifying a duplicate digital object (or part of the specification of a digital object) and other digital-object identifiers that identify digital content campaigns or digital content items for duplication.

Figure 5:
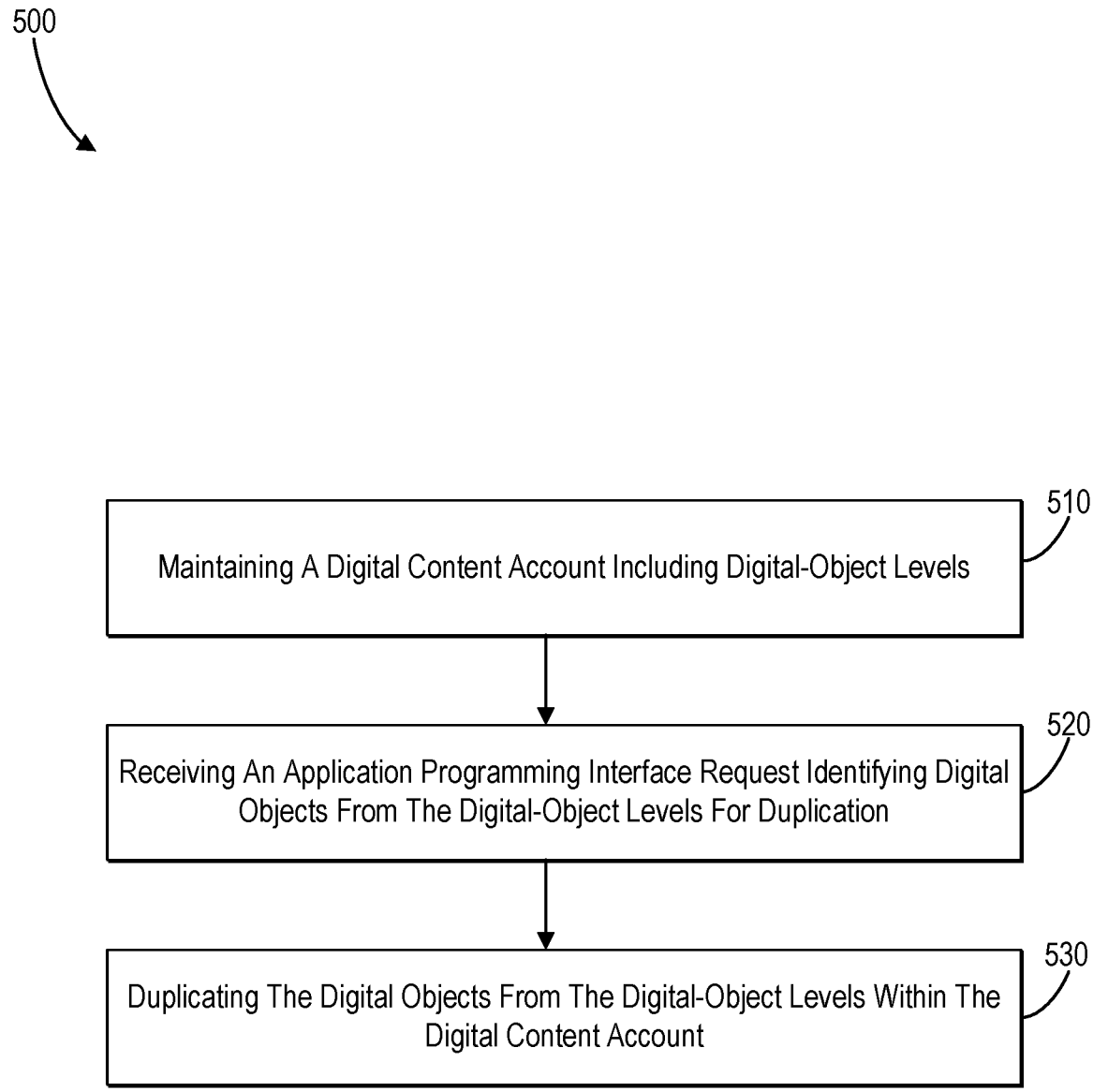
FIG. 5 illustrates a flowchart of a series of acts in a method of duplicating multiple associated digital objects from different levels of a digital content account based on an API request in accordance with one or more embodiments.

Turning now to FIG. 5, this figure illustrates a flowchart of a series of acts 500 of duplicating multiple associated digital objects from different levels of a digital content account based on an API request in accordance with one or more embodiments. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer readable storage medium can comprise instructions that, when executed by one or more processors, cause a computing device to perform the acts depicted in FIG. 5. In still further embodiments, a system can perform the acts of FIG. 5.

As shown in FIG. 5, the acts 500 include an act 510 of maintaining a digital content account including digital-object levels. In particular, in some embodiments, the act 510 includes maintaining, by a digital content distribution system, a digital content account including digital-object levels comprising: a third level for one or more digital content campaigns, the third level comprising a campaign objective for each of the one or more digital content campaigns; a second level for one or more digital content sets, the second level comprising, for each of the one or more digital content campaigns, budgetary parameters, scheduling parameters, and audience parameters; and a first level for one or more digital content items, the first level comprising creative content for each of the one or more digital content items.

Additionally, in certain embodiments, the campaign objective for each of the one or more digital content campaigns comprises awareness, reach, website traffic, application installations, video views, lead generation, post engagement, social-media-page likes, event responses, conversions, product-catalog sales, or store visits. By contrast, in some embodiments, the budgetary parameters comprise a daily monetary budget, the scheduling parameters comprise a schedule for distributing digital content items, and the audience parameters comprise a demographic group and geographic location. Additionally, in some embodiments, the creative content for each of the one or more digital content items comprises one or more of an image, a video, a link, and a text.

As further shown in FIG. 5, the acts 500 include an act 520 of receiving an application programming interface request identifying digital objects from the digital-object levels for duplication and an act 530 of duplicating the digital objects from the digital-object levels within the digital content account. In particular, the act 520 may include receiving, by the digital content distribution system from a client device, an application programming interface request identifying digital objects from the digital-object levels for duplication.

As noted above, in some embodiments, duplicating digital objects involves either a synchronous-duplication process or an asynchronous-duplication process. For example, in some embodiments, duplicating the digital objects from the digital-object levels within the digital content account comprises duplicating the digital objects using one or more servers implementing a synchronous-duplication process comprising memory restrictions and time restrictions for duplication. In certain cases, the acts 500 further include providing to the client device a response indicating identifiers for the duplicate digital objects from the digital-object levels.

By contrast, in some embodiments, duplicating the digital objects from the digital-object levels within the digital content account comprises duplicating the digital objects using one or more servers implementing an asynchronous-duplication process comprising duplication sessions. In certain cases, the acts 500 further include providing to the client device a session identifier for a duplication session using the asynchronous-duplication process to duplicate the digital objects from the digital-object levels.

As an example of how the acts 520 and 530 are implemented, in certain embodiments, receiving the API request identifying the digital objects comprises receiving the API request identifying a digital content set of the one or more digital content sets and additional digital objects associated with the digital content set; and duplicating the digital objects from the digital-object levels comprises creating a copy of: the digital content set and associated budgetary parameters, associated scheduling parameters, and associated audience parameters; a first digital content item of the one or more digital content items and a first associated creative content, the first digital content item associated with the digital content set; and a second digital content item of the one or more digital content items and a second associated creative content, the second digital content item associated with the digital content set.

Relatedly, in some embodiments, identifying the digital content set of the one or more digital content sets and the additional digital objects associated with the digital content set comprises receiving the API request that includes a set identifier for the digital content set and a duplication parameter indicating a request to duplicate additional digital objects associated with the digital content set from the first level.

As another example of how the acts 520 and 530 are implemented, in certain embodiments, receiving the API request identifying the digital objects comprises receiving the API request identifying a digital content campaign of the one or more digital content campaigns and additional digital objects associated with the digital content campaign; and duplicating the digital objects from the digital-object levels comprises creating a copy of: the digital content campaign and an associated campaign objective; a first digital content set of the one or more digital content sets and first associated budgetary parameters, first associated scheduling parameters, and first associated audience parameters, the first digital content set associated with the digital content campaign; a first digital content item and a second digital content item of the one or more digital content items and a first associated creative content and a second associated creative content, the first and second digital content items associated with the first digital content set; a second digital content set of the one or more digital content sets and second associated budgetary parameters, second associated scheduling parameters, and second associated audience parameters, the second digital content set associated with the digital content campaign; and a third digital content item and a fourth digital content item of the one or more digital content items and a third associated creative content and a fourth associated creative content, the third and fourth digital content items associated with the second digital content set.

Relatedly, in some embodiments, receiving the API request identifying the digital content campaign and the additional digital objects associated with the digital content campaign comprises receiving the API request that includes a campaign identifier for the digital content campaign and a duplication parameter indicating a request to duplicate additional digital objects associated with the digital content campaign from the second and first levels.

As suggested above, in some embodiments an API request identifies a re-parenting digital object. For example, in certain embodiments, receiving the API request identifying the digital objects comprises receiving, from the client device, the API request identifying a re-parenting digital object with which to associate the digital objects; and duplicating the digital objects from the digital-object levels within the digital content account comprises duplicating the digital objects and associate the digital objects with the re-parenting digital object. In one or more embodiments, the digital objects from the digital-object levels comprise at least: a first digital content set of the one or more digital content sets and first associated budgetary parameters, first associated scheduling parameters, and first associated audience parameters; and a second digital content set of the one or more digital content sets and second associated budgetary parameters, second associated scheduling parameters, and second associated audience parameters; and the re-parenting digital object comprises a digital content campaign of the one or more digital content campaigns and an associated campaign objective.

In addition to the acts 510-530, in some embodiments, the acts 500 further include providing to the client device a response confirming duplication of the digital objects from the digital-object levels. In some such embodiments, providing to the client device the response comprises providing the response indicating identifiers for the duplicate digital objects from the digital-object levels.

Additionally, in certain embodiments, the acts 500 further include receiving, from the client device, an additional API request identifying a duplicated digital object and an action to modify the duplicated digital object; and modifying the duplicated digital object according to the additional API request. For example, in some embodiments, receiving the additional API request identifying the duplicated digital object and the action to modify the duplicated digital object comprises receiving the additional API request identifying a duplicated digital content set and a change to associated budgetary parameters, associated scheduling parameters, or associated audience parameters; and modifying the duplicated digital object according to the additional API request comprises modifying the associated budgetary parameters, associated scheduling parameters, or associated audience parameters according to the additional API request.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
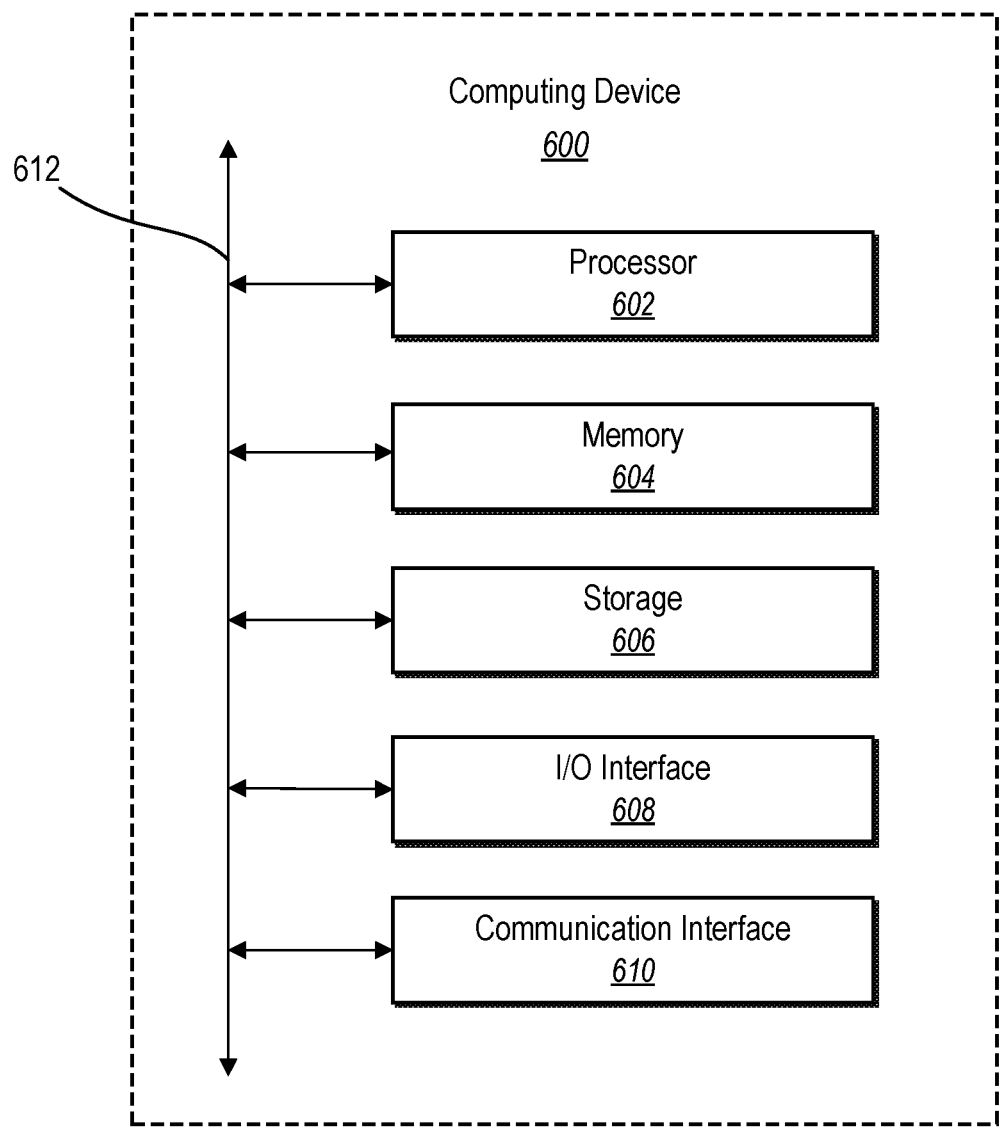
FIG. 6 illustrates a block diagram of an example computing device in accordance with one or more embodiments.

FIG. 6 illustrates a block diagram of exemplary computing device 600 that may be configured to perform one or more of the processes described above. One will appreciate that one or more computing devices such as the computing device 600 may implement the digital content distribution system 102. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers ("TLBs"). Instructions in the instruction caches may be copies of instructions in the memory 604 or the storage device 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive ("HDD"), flash memory, an optical disc, a magneto-optical disc, magnetic tape, or a Universal Serial Bus ("USB") drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 610 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 610 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other visual media items to a user's profile page (typically known as "wall posts" or "timeline posts") or in a photo album, both of which may be accessible to other users of the social-networking system depending upon the user's configured privacy settings.

Figure 7:
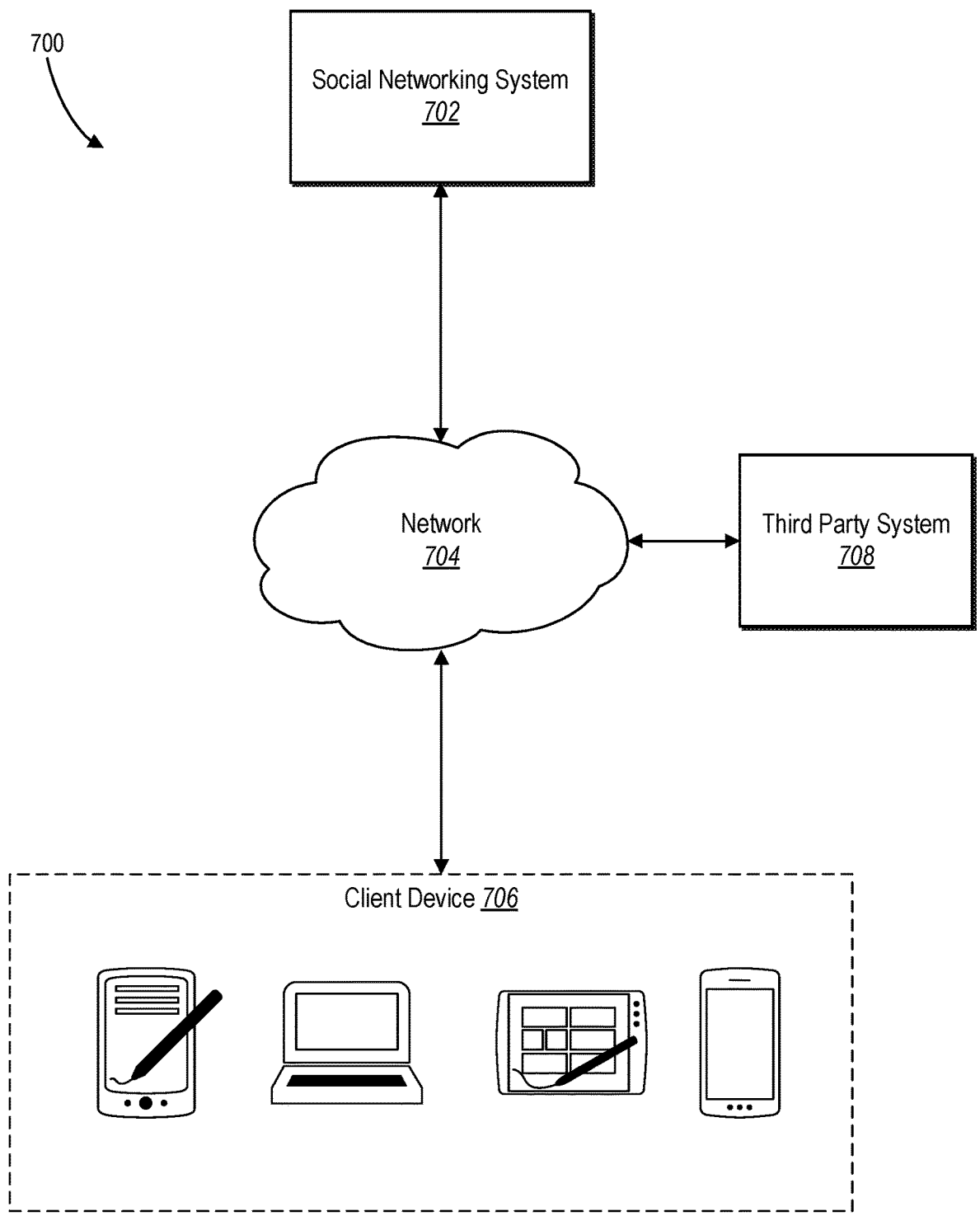
FIG. 7 illustrates a network environment of a networking system according to one or more embodiments.

FIG. 7 illustrates an example network environment 700 of a social networking system. Network environment 700 includes a client device 706, a social networking system 702, and a third-party system 708 connected to each other by a network 704. Although FIG. 7 illustrates a particular arrangement of client device 706, social networking system 702, third-party system 708, and network 704, this disclosure contemplates any suitable arrangement of client device 706, social networking system 702, third-party system 708, and network 704. As an example and not by way of limitation, two or more of client device 706, social networking system 702, and third-party system 708 may be connected to each other directly, bypassing network 704. As another example, two or more of client device 706, social networking system 702, and third-party system 708 may be physically or logically co-located with each other in whole or in part. Moreover, although FIG. 7 illustrates a particular number of client devices 706, social networking systems 702, third-party systems 708, and networks 704, this disclosure contemplates any suitable number of client devices 706, social networking systems 702, third-party systems 708, and networks 704. As an example and not by way of limitation, network environment 700 may include multiple client devices 706, social networking systems 702, third-party systems 708, and networks 704.

This disclosure contemplates any suitable network 704. As an example and not by way of limitation, one or more portions of network 704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 704 may include one or more networks 704.

Links may connect client device 706, social networking system 702, and third-party system 708 to communication network 704 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client device 706 may be an electronic device including hardware, software, or embedded logic components or a combination of two or more such components and capable of carrying out the appropriate functionalities implemented or supported by client device 706. As an example and not by way of limitation, a client device 706 may include any of the computing devices discussed above in relation to FIG. 7. A client device 706 may enable a network user at client device 706 to access network 704. A client device 706 may enable its user to communicate with other users at other client devices 706.

In particular embodiments, client device 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 706 may enter a Uniform Resource Locator ("URL") or other address directing the web browser to a particular server (such as server, or a server associated with a third-party system 708), and the web browser may generate a Hyper Text Transfer Protocol ("HTTP") request and communicate the HTTP request to server. The server may accept the HTTP request and communicate to client device 706 one or more Hyper Text Markup Language ("HTML") files responsive to the HTTP request. Client device 706 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social-networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, a social networking system 702, or a third-party system 708 to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of third-party system 708, which is separate from social networking system 702 and coupled to social networking system 702 via a network 704.

In particular embodiments, social networking system 702 may be capable of linking a variety of entities. As an example and not by way of limitation, social networking system 702 may enable users to interact with each other as well as receive content from third-party systems 708 or other entities, or to allow users to interact with these entities through an application programming interfaces ("API") or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social networking system 702. In particular embodiments, however, social networking system 702 and third-party systems 708 may operate in conjunction with each other to provide social-networking services to users of social networking system 702 or third-party systems 708. In this sense, social networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client device 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example and not by way of limitation, a user communicates posts to social networking system 702 from a client device 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client devices 706 or one or more third-party system 708 via network 704. The web server may include a mail server or other messaging functionality for receiving and routing messages between social networking system 702 and one or more client devices 706. An API-request server may allow a third-party system 708 to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client devices 706 associated with users. Advertisement-pricing modules may combine social information, the current time, location information, or other suitable information to provide relevant advertisements, in the form of notifications, to a user.

Figure 8:
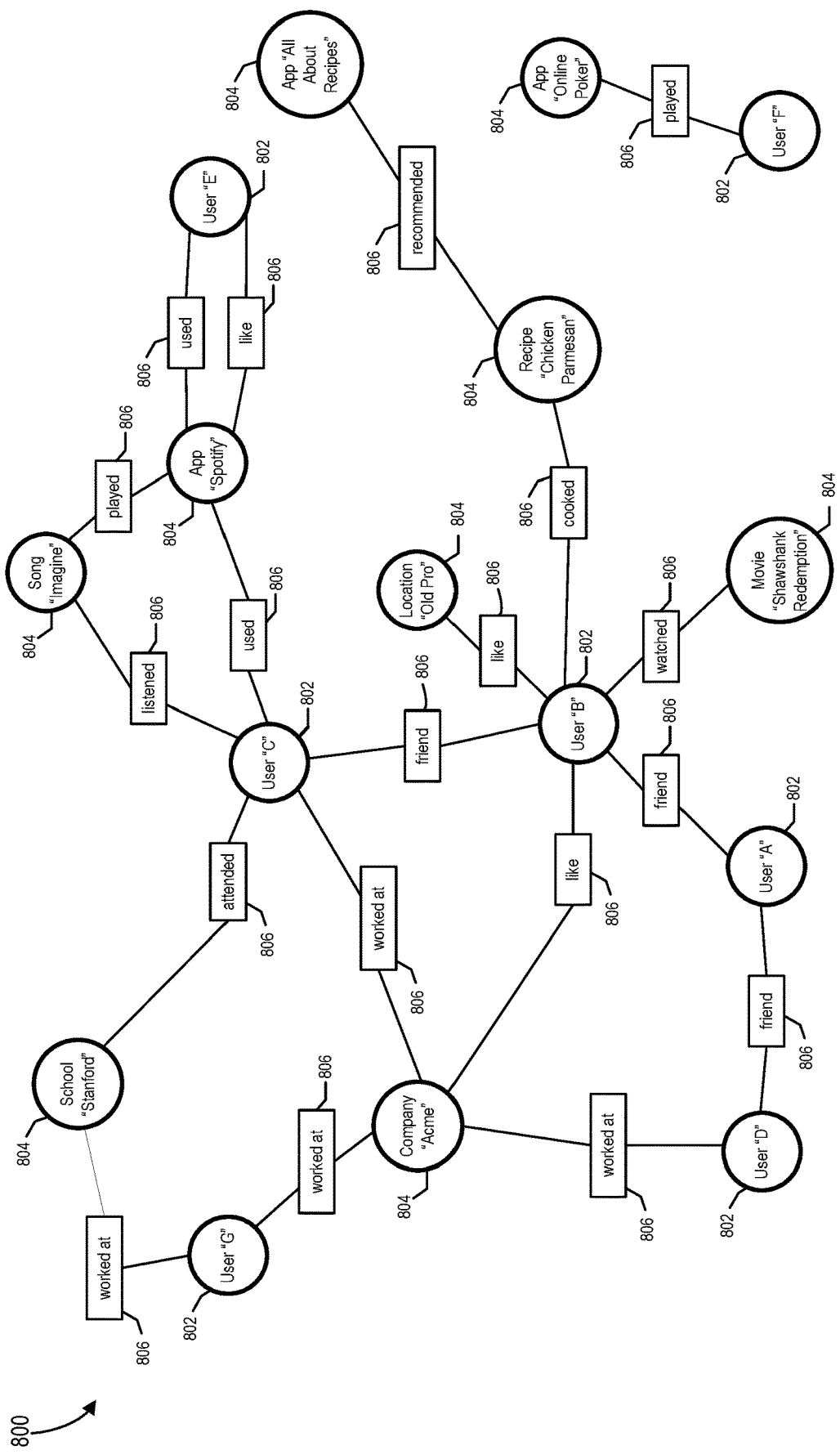
FIG. 8 illustrates an example social graph for a networking system in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client device 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition, or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social networking system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept nodes 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party system 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept nodes 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept nodes 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client device 706) may indicate that he or she likes the concept represented by the concept nodes 804 by clicking or selecting a "Like" icon, which may cause the user's client device 706 to send to social networking system 702 a message indicating the user's liking of the concept associated with the concept-profile page. In response to the message, social networking system 702 may create an edge 806 between user node 802 associated with the user and concept nodes 804, as illustrated by "like" edge 806 between the user and concept nodes 804. In particular embodiments, social networking system 702 may store an edge 806 in one or more data stores. In particular embodiments, an edge 806 may be automatically formed by social networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition or as an alternative, an advertisement may include social-networking-system context directed to the user. As an example and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example and not by way of limitation, if a user may make frequently posts content related to "coffee" or variants thereof, social networking system 702 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 706 of the user). A first user may be more interested in other users or concepts that are closer to the first user. As an example and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client device 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

We claim:

1. A system comprising:
   at least one processor; and
   at least one non-transitory computer readable storage medium storing instructions that, when executed by the at least one processor, cause the system to:
   maintain a digital content account including digital-object levels comprising:
      a third level for one or more digital content campaigns, the third level comprising a campaign objective for each of the one or more digital content campaigns;
      a second level for one or more digital content sets, the second level comprising, for each of the one or more digital content campaigns, budgetary parameters, scheduling parameters, and audience parameters; and
      a first level for one or more digital content items, the first level comprising creative content for each of the one or more digital content items;
   receive, from a client device, an application programming interface ("API") request identifying digital objects from the digital-object levels for duplication and identifying a re-parenting digital object with which to associate the digital objects;
   based on the API request:
      duplicate the digital objects from the digital-object levels within the digital content account; and
      associate the digital object with the re-parenting digital object.

2. The system of claim 1, further comprising instructions that, when executed by the at least one processor, cause the system to:
   receive the API request identifying the digital objects by receiving the API request identifying a digital content set of the one or more digital content sets and additional digital objects associated with the digital content set; and
   duplicate the digital objects from the digital-object levels by creating a copy of:
      the digital content set and associated budgetary parameters, associated scheduling parameters, and associated audience parameters;
      a first digital content item of the one or more digital content items and a first associated creative content, the first digital content item associated with the digital content set; and
      a second digital content item of the one or more digital content items and a second associated creative content, the second digital content item associated with the digital content set.

3. The system of claim 2, further comprising instructions that, when executed by the at least one processor, cause the system to identify the digital content set of the one or more digital content sets and the additional digital objects associated with the digital content set by receiving the API request that includes a set identifier for the digital content set and a duplication parameter indicating a request to duplicate additional digital objects associated with the digital content set from the first level.

4. The system of claim 1, further comprising instructions that, when executed by the at least one processor, cause the system to:
   receive the API request identifying the digital objects by receiving the API request identifying a digital content campaign of the one or more digital content campaigns and additional digital objects associated with the digital content campaign; and
   duplicate the digital objects from the digital-object levels by creating a copy of:
      the digital content campaign and an associated campaign objective;
      a first digital content set of the one or more digital content sets and first associated budgetary parameters, first associated scheduling parameters, and first associated audience parameters, the first digital content set associated with the digital content campaign;
      a first digital content item and a second digital content item of the one or more digital content items and a first associated creative content and a second associated creative content, the first and second digital content items associated with the first digital content set;
      a second digital content set of the one or more digital content sets and second associated budgetary parameters, second associated scheduling parameters, and second associated audience parameters, the second digital content set associated with the digital content campaign; and a third digital content item and a fourth digital content item of the one or more digital content items and a third associated creative content and a fourth associated creative content, the third and fourth digital content items associated with the second digital content set.

5. The system of claim 4, further comprising instructions that, when executed by the at least one processor, cause the system to receive the API request identifying the digital content campaign and the additional digital objects associated with the digital content campaign by receiving the API request that includes a campaign identifier for the digital content campaign and a duplication parameter indicating a request to duplicate additional digital objects associated with the digital content campaign from the second and first levels.

6. The system of claim 1, further comprising instructions that, when executed by the at least one processor, cause the system to duplicate the digital objects from the digital-object levels within the digital content account by duplicating the digital objects using one or more servers implementing a synchronous-duplication process comprising memory restrictions and time restrictions for duplication.

7. The system of claim 6, further comprising instructions that, when executed by the at least one processor, cause the system to provide to the client device the response by providing the response indicating identifiers for the duplicate digital objects from the digital-object levels.

8. A system comprising:
at least one processor; and
at least one non-transitory computer readable storage medium storing instructions that, when executed by the at least one processor, cause the system to:
maintain a digital content account including digital-object levels comprising:
a third level for one or more digital content campaigns, the third level comprising a campaign objective for each of the one or more digital content campaigns;
a second level for one or more digital content sets, the second level comprising, for each of the one or more digital content campaigns, budgetary parameters, scheduling parameters, and audience parameters; and
a first level for one or more digital content items, the first level comprising creative content for each of the one or more digital content items;
receive, from a client device, an application programming interface ("API") request identifying digital objects from the digital-object levels for duplication; and
duplicate the digital objects from the digital-object levels within the digital content account by using one or more servers implementing an asynchronous-duplication process comprising duplication sessions.

9. The system of claim 8, further comprising instruction that, when executed by the at least one processor, cause the system to:
receive the API request identifying the digital objects by receiving, from the client device, the API request identifying a re-parenting digital object with which to associate the digital objects; and
duplicate the digital objects from the digital-object levels within the digital content account by duplicating the digital objects and associating the digital objects with the re-parenting digital object.

10. The system of claim 9, wherein the digital objects from the digital-object levels comprise at least:

a first digital content set of the one or more digital content sets and first associated budgetary parameters, first associated scheduling parameters, and first associated audience parameters; and
a second digital content set of the one or more digital content sets and second associated budgetary parameters, second associated scheduling parameters, and second associated audience parameters; and
the re-parenting digital object comprises a digital content campaign of the one or more digital content campaigns and an associated campaign objective.

11. The system of claim 8, further comprising instructions that, when executed by the at least one processor, cause the system to provide to the client device a response confirming duplication of the digital objects from the digital-object levels.

12. The system of claim 8, further comprising instructions that, when executed by the at least one processor, cause the system to provide to the client device a response indicating identifiers for the duplicate digital objects from the digital-object levels.

13. The system of claim 8, further comprising instructions that, when executed by the at least one processor, cause the system to:
receive, from the client device, an additional API request identifying a duplicated digital object and an action to modify the duplicated digital object; and
modify the duplicated digital object according to the additional API request.

14. The system of claim 8, further comprising instructions that, when executed by the at least one processor, cause the system to provide to the client device a session identifier for a duplication session using the asynchronous-duplication process to duplicate the digital objects from the digital-object levels.

15. A non-transitory computer readable medium storing instructions thereon that, when executed by at least one processor, cause a computer system to:
maintain a digital content account including digital-object levels comprising:
a third level for one or more digital content campaigns, the third level comprising a campaign objective for each of the one or more digital content campaigns;
a second level for one or more digital content sets, the second level comprising, for each of the one or more digital content campaigns, budgetary parameters, scheduling parameters, and audience parameters; and
a first level for one or more digital content items, the first level comprising creative content for each of the one or more digital content items;
receive, from a client device, an application programming interface ("API") request identifying digital objects from the digital-object levels for duplication; and
duplicate the digital objects from the digital-object levels within the digital content account by using one or more servers implementing an asynchronous-duplication process comprising duplication sessions.

16. The non-transitory computer readable medium of claim 15, further comprising instructions that, when executed by the at least one processor, cause the computer system to:
receive, from the client device, an additional API request identifying a duplicated digital object and an action to modify the duplicated digital object; and
modify the duplicated digital object according to the additional API request.

17. The non-transitory computer readable medium of claim 16, further comprising instructions that, when executed by the at least one processor, cause the computer system to:
- receive the additional API request identifying the duplicated digital object and the action to modify the duplicated digital object by receiving the additional API request identifying a duplicated digital content set and a change to associated budgetary parameters, associated scheduling parameters, or associated audience parameters; and
- modify the duplicated digital object according to the additional API request by modifying the associated budgetary parameters, associated scheduling parameters, or associated audience parameters according to the additional API request.

18. The non-transitory computer readable medium of claim 15, wherein the campaign objective for each of the one or more digital content campaigns comprises awareness, reach, website traffic, application installations, video views, lead generation, post engagement, social-media-page likes, event responses, conversions, product-catalog sales, or store visits.

19. The non-transitory computer readable medium of claim 15, wherein the budgetary parameters comprise a daily monetary budget, the scheduling parameters comprise a schedule for distributing digital content items, and the audience parameters comprise a demographic group and geographic location.

20. The non-transitory computer readable medium of claim 15, wherein the creative content for each of the one or more digital content items comprises one or more of an image, a video, a link, or a text.

* * * * *